(12) United States Patent
Hobbs

(10) Patent No.: US 6,523,022 B1
(45) Date of Patent: Feb. 18, 2003

(54) METHOD AND APPARATUS FOR SELECTIVELY AUGMENTING RETRIEVED INFORMATION FROM A NETWORK RESOURCE

(76) Inventor: Allen Hobbs, 26 E. 10th St., Apt. 8C, New York, NY (US) 10003

( * ) Notice: Subject to any disclaimer, the term of this patent is extended or adjusted under 35 U.S.C. 154(b) by 0 days.

(21) Appl. No.: 09/348,813

(22) Filed: Jul. 7, 1999

Related U.S. Application Data

(63) Continuation-in-part of application No. 08/871,773, filed on Jun. 9, 1997.

(51) Int. Cl.[7] .............................................. G06F 17/00
(52) U.S. Cl. .............................. 707/3; 707/102; 707/4; 707/5; 707/6
(58) Field of Search ............... 707/1–206; 709/100–332

(56) References Cited

U.S. PATENT DOCUMENTS

| | | | | |
|---|---|---|---|---|
| 5,781,190 A | * | 7/1998 | Gorbet et al. ................ | 709/200 |
| 5,805,824 A | * | 9/1998 | Kappe ......................... | 709/242 |
| 5,983,268 A | * | 11/1999 | Freivald et al. ............. | 709/218 |
| 6,298,342 B1 | * | 10/2001 | Graefe et al. .................. | 707/4 |
| 6,317,738 B1 | * | 11/2001 | Lohman et al. ................ | 707/3 |
| 6,341,288 B1 | * | 1/2002 | Yach et al. .................. | 707/100 |

OTHER PUBLICATIONS

Milicev, "Automatic model transformations using extended UML object diagrams in modeling environments", Software Engineering, IEEE Transactions on, vol. 28, Issue 4, Apr. 2002, pp. 413–431.*

Li et al., "Query relaxation by structure and semantics of logical Web documents", Knowledge and Data Engineering, IEEE Transactions on, vol. 14, Issue 4, Jul.–Aug. 2002, pp. 768–791.*

Palamas et al., "An Internet–based system for the commerce of medical devices.", IEEE Engineering in Medicine and Biology Magazine, vol. 21, Issue 2, Mar.–Apr. 2002, pp. 26–32.*

* cited by examiner

Primary Examiner—David Jung
(74) Attorney, Agent, or Firm—Coudert Brothers

(57) ABSTRACT

An apparatus and corresponding method for selecting multimedia information, such as video, audio, graphics and text residing on a plurality of Data Warehouses, relational database management systems (RDMS) or object-oriented database systems (ODBA) connected to the Internet or other network, and for linking the multimedia information across the Internet, or other network, to any phrase, work, sentence and paragraph of text; or numbers; or maps; charta, and tables; or still pictures and/or graphics' or moving pictures and/or graphics; or audio elements contained in documents on an Internet or intranet web site so that any viewer of a web site, or other network resource, can directly access updated information in the Data Warehouse or a database in real time are disclosed. The apparatus and corresponding method each: (i) stores a plurality of predetermined authentication procedures (such as user names and passwords) to gain admittance to Data Warehouses or databases, (ii) stores the Universal Resource Locators of intranet and Internet addresses of a plurality of expert-predetermined optimum databases or Data Warehouses containing text, audio, video and graphic information, or multimedia information relating to the information on the web site or other network resource; (iii) stores a plurality of expert-predetermined optimum queries for use in the search engines of each of the preselected databases, each query representing a discrete searchable concept as expressed by a work, phrase, sentence or paragraph of text, or any other media such as audio and video on a web site, or other network resource; and (iv) presents to the user the results of a search of the Data Warehouse or database through a graphical user interface (GUI) which coordinates and correlates viewer selection criteria with the expert optimum remote database selection and queries.

41 Claims, 18 Drawing Sheets

METHOD AND APPARATUS FOR SELECTIVELY AUGMENTING RETRIEVED INFORMATION FROM A NETWORK RESOURCE

This application is a Continuation-in-Part of application Ser. No. 08/871,773, filed Jun. 9, 1997.

NOTICE OF COPYRIGHT

A portion of the disclosure of this patent document contains material that is subject to copyright protection and to which a claim of copyright protection is made. The owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to information retrieval, and the application and deployment architecture for such information retrieval. Specifically, the present invention concerns a multi-tier client/server model for record retrieval wherein optimum record retrieval from a database is achieved based on embedded expert judgments linked to words, phrases, sentences and paragraphs of text; or numbers; or maps, charts, and tables; or still pictures and/or graphics; or moving pictures and/or graphics; or audio elements (hereinafter sometimes collectively referred to as the "links" or "Linked Terms," or when any one of the aforementioned elements are used singly, as the "link" or "Linked Term"), contained in documents on a network resource, such as a web site and incorporating an intuitive graphical user interface (GUI) to correlate through a plurality of frames or inline frames, dynamic framesets, layers or adding to the display a plurality of fixed or floating pop-up windows, or any combination of the foregoing the retrieved records with records from one remote database or a large collection of remote databases maintained by one company, called a Data Warehouse, plus means to select various databases or Data Warehouses and a comprehensive selectable index of the linked embedded expert judgments.

BACKGROUND OF THE INVENTION

"Pull" Technology

A conventional information retrieval system includes a database of records, a processor for executing searches on the records, and application software that controls how the retrieval system, such as a database management system (DBMS), accepts the search queries, manages the search, and handles the search results. Generally, the database includes records such as text documents, financial or court records, medical files, personnel records, graphical data, technical information, audio and video files or various combinations of such data. Typically, a user enters a password and client billing information, and then initiates the search by finding the appropriate database or groups of databases to search and formulating a proper query that is sent to the DBMS. This process is known as searching by pull technology. To effectively search and retrieve records from the database, the DBMS typically offers a limited variety of search operations, or query models, specifically designed to operate on the underlying records in the database. The query models are coordinated and executed by an application generally referred to as a search engine. For example, a document database, such as a database of court opinions, may be organized with each court opinion as a record with fields for the title of the case, jurisdiction, court and body text. A simple search engine may support a full text searching query model for all the text fields, individual field searching, such as searching by court or jurisdiction, and various Boolean search operations such as and, or, and not. More sophisticated search engines may support the following query models:

1. nested Boolean or natural language searches;
2. grammatical connectors that search for terms in a grammatical relationship such as within the same sentence or paragraph (e.g., "/s", "/p", etc.);
3. proximity connectors that require search terms to appear within a specified number of terms of each other (e.g., "w/5");
4. exclusion terms ("BUTNOT");
5. weighted keyword terms;
6. wildcards;
7. specification of the order in which the database processes the search request (e.g., grouping words in parenthetical expressions);
8. restriction of the search to certain fields, and formulation of a restricted search such as by date, subject, jurisdiction, title, etc.; and
9. combination of the fields of search.

In addition, large commercial database providers, such as BLOOMBERG, DIALOG, LEXIS/NEXIS and WESTLAW typically have thousands of individual databases. These large commercial database providers are Data Warehouses, which comprise an architecture and process where data are extracted from external information providers, then formatted, aggregated, and integrated into a read only database that is optimized for decision making. Users subscribe to the Data Warehouses by monthly or yearly subscription, and then typically pay stratified levels of hourly charges for access to certain databases, or groups of databases. More recently, Data Warehouses have been selling their content over the Internet by individually pricing each article or document. This is known as "by the drink" pricing since the user does not subscribe to a service over time, but buys only the article s/he wants at one time.

Drawbacks of Pull Technology

One limitation of existing information retrieval systems, especially among the commercial Data Warehouses, is the burden on the user to first enter client and billing information and passwords to gain access and initiate the search, and then formulate the search query. Typically, the subscription based commercial database services provide password administration and extensive catalogues, both in print and on-line, describing the content and scope of the databases offered, and in some cases, live assistance by telephone by reference librarians who assist the user to find the proper databases. However, the user must remember the password, and spend time finding the proper database by catalogue, on-line access, or phone, or else incur more expensive hourly charges searching through single databases or groups of databases for the appropriate database content and scope.

A second limitation of pull technology is the formulation of the search query. To use the more powerful commercial Data Warehouses effectively, a user must be trained to use all of the aforementioned query models, and have sufficient knowledge of the topic to choose the appropriate keywords or natural language terms. The complexity of the search process compels the commercial Data Warehouses to offer training and keyword help to their subscribers by multiple publications that describe search tips; interactive software based training modules; account representatives who visit the user and train him or her; and customer service and reference librarians available by phone.

A third limitation of pull technology concerns how it is employed on the World Wide Web area of the Internet ("WWW") by such search engines as THE ELECTRIC LIBRARY, EXCITE!, FOUR ONE ONE (411), HOTBOT, INFOSEEK, LINKSTAR, LYCOS, MAGELLAN, ALTA VISTA, OPEN TEXT INDEX, WEB CRAWLER, WWWWORM, and YAHOO!, just to name a few. These search engines' query models are beginning to approach the sophistication and complexity of those of the commercial database companies, but unlike the commercial databases, they offer minimal customer support. Another drawback of the Internet search engines, well documented in the computer business and popular press, is that their search engine algorithms cause multiple irrelevant responses to a query. Other drawbacks of Internet search engines employing pull technology include:

1. The great majority of the Internet search engines have no control over the records in their database. Unlike the commercial Data Warehouses who have an ongoing relationship with the content provider (usually by a license agreement), and who carefully screen, cleanse and format the information provided by their information providers, many Internet search engines sweep through the WWW periodically and automatically, and catalogue web sites as records in their databases. They also permit any web publisher to submit his or her web site as a record entry with little or no prior screening.
2. As a result of little or no screening, and absolutely no contact with the information provider, Internet search engines often provide search results that have multiple "dead ends," the result of links which are often moved or deleted after the search engines have catalogued them. Moreover, the web sites' authors can sometimes manipulate the words on their site and cause the Internet search engines to list their websites higher on the search engine's relevancy lists than other web sites.
3. The search engines' databases include only a fraction of the Internet's content, and even then, the content may be from dubious sources, or sources which are not updated frequently.
4. Where the web sites include embedded search terms in links in documents to existing Internet search engines or current awareness "news" databases, since the words are linked to the free Internet search engines discussed above, the information retrieved, for reasons explained above, is not reliable and users often receive multiple irrelevant responses. Words linked to the current awareness databases receive more useful information, but there is no GUI correlating and synchronizing the records of multiple databases. Typically, those web sites pass authentication information by the QUERY_STRING environment variable. Once placed on the command line by the browser, the viewer can see all passwords and user names in the authentication argument.

The considerable logistical and practical drawbacks of pull technology are illustrated in the following example of an investment banker who is responsible for buying bonds for an institutional investor, such as a bank or an insurance company. This hypothetical investment banker, based on an actual person, will be used at different points throughout this patent application to illustrate and support the novelty and unobviousness of the present invention.

Every week, this investment banker must go before a board of executives at this bank and provide them with a list of bonds that he had examined and analyzed and recommends to the bank to buy. In order to do his due diligence he must cover in his report five areas of research concerning the bond: (1) compare the bond price to other bond prices (the Bond Comparables); (2) obtain historical data concerning the bond and the company issuing the bond (the Historical Data); (3) obtain the Securities and Exchange filings, such as 10K's, and 10Q's for the company issuing the bond (the SEC Filings); (4) obtain specific information from a wide variety of publications concerning the industry in which the company operates (the Industry Data); and (5) obtain information concerning the historical and anticipated performance of the company's stock (the Stock Data). Furthermore, he has to read various newsletters and white papers issued by investment banks desiring to sell the bonds to him, and which analyze the bonds using the same criteria mentioned above. In order to collect the data, this investment banker must log on and enter password and billing information; find the appropriate databases; and formulate the search and obtain the results in three to five different Data Warehouses, each of which are organized differently from one another and have different methods to enter search queries, and different query models. While pull technology satisfies the demands for the breadth and depth of the search (since the user can formulate his or her own queries, and make unlimited selections of databases to search) it is time consuming, cumbersome and expensive because the user must find the appropriate query formulation and database or databases within which to run the query, sometimes even in different Data Warehouses.

"Push" Technology

In response to the flood of information facing the typical Internet viewer under the pull model, the complexity of the query statements, and the well documented inability of the Internet search engines to locate and deliver relevant content, software companies developed software agents to push information to viewers. The push model is also known as webcasting.

Underpush, computers sift through large volumes of information, filtering, retrieving and then ranking in order of importance articles of current interest. The viewer fills out a "profile" (also called a "channel"), that defines a predefined area of interest or activates a filter. This, in turn, causes the webcast search engine to search its own databases, or the databases of others, for content matching the profile or the filters submitted by the viewer. The viewer, in order to access the channels and have the content "pushed" to him or her, must download special client software which acts either independently of, or in conjunction with, the viewer's browser. Alternatively, a viewer can access a dynamically generated web page on the webcaster's server that lists the found articles. (An example of a dynamically generated web page is "Newspage Direct" by Individual, Inc.)

One early version of the Internetpush model, developed by Pointcast Inc., clogged the network behind a corporation's firewall when large numbers of the employees' software agents pulled information from Pointcast's servers on the Internet at or near the same time. Pointcast later alleviated this problem by providing remote servers that could operate behind a company's firewall and request and collect (or cache) information at once or at predetermined times from the Pointcast severs on the Internet. These intermediate servers then pushed the information to employees, which effectively centralized the distribution of information in the Information Services (IS) department.

As mentioned above, all push technology requires that users compile a "profile" to detail their interests. The prior art of delivering the information obtained by the search engine pursuant to the profile is divided into three broad categories: offline browsers; e-mail delivered content providers and information channels.

The offline browsers typically operate by requiring a user to complete a profile with predetermined categories; automatically search the Internet for the information specified in the profile and download the materials to the user's hard drive for viewing at a later time when the user is off the Internet. This first category of products include: Freeloader by Freeloader, Inc.; Smart Delivery by FirstFloor, Inc.; WebEx by Traveling Software, Inc.; WebRetriever by Folio Inc. and WebWhacker by ForeFront Group, Inc.

The second category of push products delivers the results of searches performed pursuant to the user's profile directly to the user's e-mail box, and includes: Netscape's Inbox Direct and Microsoft Mail.

The third category of push products arranges the predetermined categories into "channels" and uses filters to allow users to customize their news deliveries from a broad range of proprietary news sources. It is claimed that the results of the searches are pushed or "broadcast" in real time to the viewer. Examples of this type of service include: BackWeb by BackWeb, Inc.; Headliner by Lanacom, Inc.; Incisa by Wayfarer, Inc.; Intermind by Intermind, Inc.; Pointcast by Pointcast, Inc.; and Marimba by Marimba, Inc. However, since the retrieved data is first cached on the service provider's server (e.g., Pointcast's server), and then again on the company's servers behind the firewall, the results of the search are not really "broadcast in real time."

There is a fourth category of push products which do not fall neatly into any of the above three categories of delivery. Citizen 1 by Citizen 1 Software, Inc., is a human organized hierarchical listing of free Internet search engines. The user can then select a number of databases which fall under that category, and run several simultaneous queries in the databases. Digital Bindery by Digital Bindery Company allows users to "subscribe" to web pages as they browse. Once a subscriber, the user will automatically receive via e-mail any updates to the web pages to which the user subscribed.

Webcasting attempts to eliminate the inefficiencies of pull technology, namely the time consuming and unproductive hunt for information through Internet search engines. Instead of an open ended search through many databases linked to the web by various search engines, as is done under the pull model, push substitutes one central secure database which has collected either the content itself, or the links to the content. However, in spite of the name, push, the information provider does not drive the distribution of data. Instead, a client (in a client/server arrangement) contacts the information provider and requests the information. The client then downloads the information in the background, giving the impression that it is broadcast, when in fact, it is only automatically downloaded at a predetermined time.
Shortcomings of "Push" Technology "Push" may be a satisfactory method for serving information to knowledge workers who depend on a constant stream of updated factual information served in narrow categories. Examples of these kinds of workers would be sales representatives who must find new prospects, staff in field offices who must be aware of sudden price changes, information managers who must distribute software upgrades and marketing professionals who must be aware of the new products released by the competition.

However, there is a category of knowledge workers whose information needs are not properly satisfied by push technology. The hypothetical investment banker discussed above is an example of such a knowledge worker. These knowledge workers cannot use "filters" and "profiles" to provide the most relevant information since the information they need cannot easily fit into categories, but rather spans categories. These knowledge workers use information to solve problems that are rarely alike. They need information to solve a problem, but they do not know what they need day to day.

This knowledge worker culls information and sparks creativity by comparisons and contrasts, juxtapositions, and induction and deduction, rather than by looking at raw news reports. The investment banker discussed above, usually does not know well in advance what industry or company he will be analyzing. He also does not always know where his research and analyses will take him, or what databases he will use. His decisions are tied into so many variables that exist in the marketplace that his information cannot be predetermined by a general form or profile. A further limitation of webcasting is that it has not struck the optimum balance between burdening the viewer with a persistent stream of alerts versus alerting the viewer when new information has arrived.

Moreover, since webcasting centralizes the development, control and the administration of "profiles" within an Information Services (IS) department, certain knowledge workers' information needs may not be satisfied by such centralization. IS departments, already strapped for resources to manage mail servers, web servers, Lotus Notes servers and application servers, may not be capable of managing servers that maintain lists of user "profiles" and dispatch software agents into the World Wide Web (WWW). Thepush model works only if IS departments proactively keep the profile lists current and advertise them internally. Finally, there may be enormous legal ramifications, as of yet not addressed, to corporations downloading copyrighted material to their internal servers and redistributing it internally, especially if the push purveyor links to other websites or search engines without permission. See, "Legal Situation Is Confused on Web Content Protections,"*New York Times*, Jun. 9, 1997, at page D5.

Furthermore, all the above examples of "push" technology except for "Digital Bindery", require the buying, installation, maintenance and updating of software by both the publisher and the user.

In addition to the above-mentioned disadvantages, both the push and pull models fail to address the need to efficiently, inexpensively, and frequently augment web sites with current or historical data. According to the Mar. 11, 1997 Wall Street Journal, in an article entitled At Thousands of Web Sites, Time Stands Still: "Nearly five million pages of a total 30 million indexed by AltaVista on the Web haven't been updated at all since early 1996 . . . . Some 424,000 pages haven't been refreshed since early 1995— and 75,000 Web pages haven't been touched since before 1994:"

Therefore, it is desirable to dynamically augment a static web page containing text, audio, graphics, and/or video information on a network resource with Linked Terms connected to current awareness and/or historical records from expert pre-selected Data Warehouses or single databases, thereby saving the enormous labor and time costs involved in updating web pages.

It is similarly desirable to permit users to choose and narrow their own search criteria through pull technology by clicking on Linked Terms in a written document, and still obtain the benefits of push technology by having current awareness and historical records pushed to update their selections without introducing new protocols or application programmer interfaces (API's) to operate. It is therefore desirable to provide a method and apparatus, use of which does not encumber the user's or publisher's computer system in the following ways: 1) neither the user, nor the publisher have to buy, install, maintain or update software to use the invention; 2) use of the method and apparatus does not require large hard disk and memory allocations by the user; and 3) as a result of "2," use of the method and apparatus does not preclude using otherpush products simultaneously. This invention can work with any operating system that employs a browser, and can accommodate any binary data type, including FTP repositories, full Java applets and VRML, and any browser plug-in, such as Shockwave applications. Moreover, it can deliver information from a variety of sources, including from the Internet, company databases, groupware and intra- and extranets.

Finally, given the almost exclusive use of current awareness and historical data on databases for research purposes in the prior art, the present invention is unique and unobvious because it is the only invention that updates Linked Terms in any written document, including web pages, with current and/or archived information from databases and Data Warehouses using a proprietary user interface and embedded expert judgment. Updating web pages and written content in this matter effectively transforms raw information into data which can support any point made in any written document. So, for example, if the document is used for marketing purposes, this invention would permit raw information to be used for marketing purposes, etc.

It is also desirable to provide a method and apparatus, which, rather than seeking to identify records on a database whose characteristics exactly match what the user types into a query model, embody one or more kinds of expert judgement data for the purpose of selectively retrieving on demand the best fitting or most appropriate records in response to user data entry. Accordingly, it is desirable to provide a query architecture for an information retrieval method and apparatus that utilizes both pull andpush technologies wherein knowledge workers can select their database resources based on the issue they must solve and current awareness or historical data can be pushed to them based upon embedded expert judgment based on the same issue once they have selected the database resources.

It is further desired that the Linked Terms in any document be augmentative and allow for the efficient integration of embedded expert judgment that correlates a user's choice of a Linked Term with optimum data information judgments or designations to identify those data where the fit between the user's choice of a Linked Term and optimum data for that Linked Term is best.

SUMMARY OF THE INVENTION

Broadly stated, the present invention encompasses a method of dynamically augmenting the contents of file of information on a first network resource, the information file having at least one link, comprising the steps of: creating at least one request corresponding to the at least one link; coupling at least one query argument with the at least one request; sending the at least one request and the at least one query argument to the database, causing the database to search for at least one record that satisfies the at least one query argument; providing a display for viewing by a user; subdividing the display into a plurality of frames or inline frames, dynamic frame sets, layers or adding to the display a plurality of fixed or floating pop-up windows, or any combination of the foregoing; displaying the at least one record that satisfies the at least one query argument in at least a first frame or inline frame, dynamic frame sets, layers or fixed or floating pop-up window, or any combination of the foregoing of the plurality of frames or inline frames, dynamic frame sets, layers or fixed or floating pop-up windows, or any combination of the foregoing; and providing a series of graphic symbols in at least a second frame or inline frame, dynamic frame sets, layers or fixed or floating pop-up window, or any combination of the foregoing of said plurality of frames or inline frames, dynamic frame sets, layers or fixed or floating pop-up windows, or any combination of the foregoing for enabling the user to select one of a plurality of databases.

In a preferred method of the present invention, at least one authentication argument is coupled to the at least one query argument and the at least one request. Furthermore, in a preferred method, the at least one request, the at least one query argument and the at least one authentication argument are sent to the database. The preferred method of the present invention further comprises subdividing the display into a second plurality of frames or inline frames, dynamic frame sets, layers or adding to the display a plurality of fixed or floating pop-up windows, or any combination of the foregoing to replace the plurality of frames or inline frames, dynamic framesets, layers or fixed or floating pop-up windows, or any combination of the foregoing and providing a list of index terms in at least one frame or inline frames, dynamic framesets, layers or fixed or floating pop-up window, or any combination of the foregoing of the second plurality of frames, inline frames, dynamic framesets, layers or adding to the display a plurality of fixed or floating pop-up windows, or any combination of the foregoing, where the index terms are for selecting the at least one link in the at least one file of information on the first network resource.

In a preferred embodiment, the at least one request comprises a request header specifying: (a) a purpose of the request; (b) a network address of a second network resource to which the request header is applied; (c) a file name for an application that is stored on the second network resource and (d) an argument that acts as a key in a table lookup, hash table, associative array or linked list on the second network resource; and wherein an application that executes on a second network resource correlates in said table lookup, hash table, associative array or linked list the key with one of a plurality of expert predetermined optimum values, each expert predetermined value comprising a network address for a database, a query argument, and an authentication argument. In a preferred embodiment, the key can be used to create a window display for viewing by a user, the window presenting the user with a menu of choices for further areas of research pertaining to the key. The user, by selecting one of the menu choices, causes the application that is executed on the second network resource to match a key, corresponding to one of the choices in a table lookup, hash table, associative array or linked list, with a request header comprising: (a) a purpose of the request; (b) a network address for a third network resource to which the request header is applied; (c) a file name for an application that is stored on the third network resource; (d) a query argument; and (e) an authentication argument; and causes the application on the second network resource to send the request header to the third network resource.

In another embodiment of the present invention, at least one embedded application is sent from the second network resource to the browser. The embedded application performs one or more of the functions previously performed by the application that is executed on the second network resource in the first embodiment of the present invention such as correlating in the table lookup, hash table, associative array or linked list the key with one of a plurality of the expert predetermined optimum values, or subdividing the display into at least a first frame, window or inline frame, or any combination thereof. The embedded application is preferably an applet, The present invention also encompasses providing an apparatus for dynamically augmenting the contents of a file of information on a first network resource, the information file having at least one link, comprising: a browser having a display for viewing by a user; a second network resource coupled to the browser, wherein the browser sends at least one request corresponding to the at least one link to the second network resource, further wherein the second network resource couples at least one query argument with the at least one request, the second network resource further causing the browser to subdivide said display into a plurality of frames or inline frames, dynamic framesets, layers or adding to the display a plurality of fixed or floating pop-up windows, or any combination of the foregoing; and a database coupled to the second network resource, wherein the second network resource sends the at least one request and the at least one query argument to the database, the database comprising a search engine for searching for at least one record in the database that satisfies the at least one query argument; wherein the at least one record that satisfies the at least one query argument is displayed in at least a first frame or inline frame, dynamic frameset, or fixed or floating pop-up window, or any combination of the foregoing of said plurality of frames or inline frames, dynamic framesets or layers, or fixed or floating pop-up windows, or any combination of the foregoing and a series of graphic symbols are displayed in at least a second frame or inline frame, dynamic frameset, layer or fixed or floating pop-up window, or any combination of the foregoing of said plurality of frames or inline frames, dynamic framesets, or layers or fixed or floating pop-up windows, or any combination of the foregoing for enabling the user to select one of a plurality of databases.

In a preferred embodiment, the display is subdivided into a second plurality of frames or inline frames, dynamic framesets, layers or fixed or floating pop-up windows, or any combination of the foregoing to replace the plurality of frames or inline frames, dynamic framesets, layers or fixed or floating pop-up windows, or any combination of the foregoing and a list of index terms are displayed in at least one frame or inline frame, dynamic frameset, layer or fixed or floating pop-up window, or any combination of the foregoing of the second plurality of frames or inline frames, dynamic framesets, layers or fixed or floating pop-up windows, or any combination of the foregoing, the index terms for selecting the at least one link in the at least one file of information on the first network resource. Also in a preferred embodiment, the second network resource couples at least one authentication argument to the at least one request and the at least one query argument, further wherein the second network resource sends the at least one request, the at least one query argument, and the at least one authentication argument to the database. The second network resource preferably further comprises a memory for storing a table look up, hash table, associative array or linked list having a plurality of expert predetermined optimum values, each of the expert predetermined optimum value having a network address for a database, a query argument, and an authentication argument, further wherein the at least one request comprises an argument that acts as a key in the table lookup, the key being correlated with one of the expert predetermined optimum values.

In another embodiment of the apparatus of the present invention, at least one embedded application is sent from the second network resource to the browser. The embedded application that is sent to the browser performs one or more of the functions that are performed by the application on the second network resource, such as correlating in the table lookup, hash table, associative array or linked list the key with one of a plurality of the expert predetermined optimum values, or subdividing the display into at least a first frame, window or inline frame, or any combination thereof.

An advantage of the present invention is that it provides a method and apparatus to cost-effectively and dynamically update web pages containing text, audio, graphics and/or video data that are a part of a network resource with Linked Terms connected to current awareness or historical records from expert pre-selected Data Warehouses or single databases, without undue waste of time and labor.

Another advantage of the present invention is that it provides the ability for network users to have access to a large number of electronic database providers (i.e., BLOOMBERG, DIALOG, DOW JONES, LEXIS/NEMS, WESTLAW, etc.) without being limited to a particular proprietary graphical user interface (GUI), entering passwords or billing information or being trained to use the query models for each Data Warehouse.

Yet another advantage of the present invention is that it provides for a wide spread dissemination of information from databases and Data Warehouses without the cost and security problems to the Data Warehouses of training users to use the system or issuing and administering a large number of passwords.

BRIEF DESCRIPTION OF THE DRAWINGS

The aforementioned and related advantages and features of the present invention will become apparent upon review of the following detailed description of the invention, taken in conjunction with the following figures, where like numerals represent like elements, in which.

DETAILED DESCRIPTION OF THE INVENTION

Figure 1:
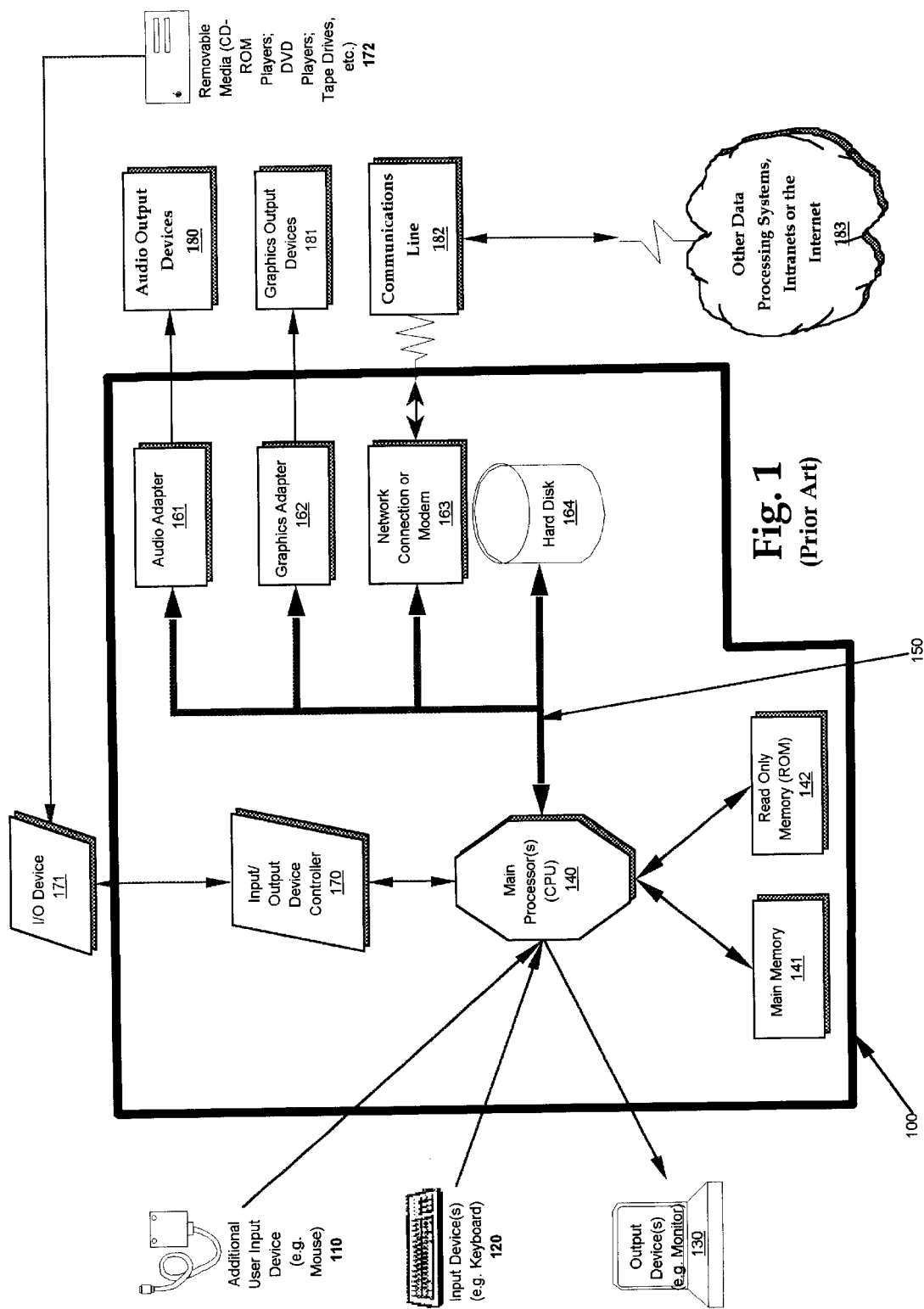
FIG. 1 is a block diagram of a typical digital computer utilized by a preferred embodiment of the present invention.

The present invention overcomes the limitations of the prior art by providing an augmentative query architecture that allows for the creation, addition and subsequent integration of embedded expert judgement and authentication information into a query submitted to an information retrieval system, together with an intuitive GUI designed to correlate through a plurality of frames or inline frames, dynamic framesets, layers or fixed or floating pop-up windows, or any combination of the foregoing, the responses of the information retrieval system; a series of graphic symbols for enabling the user to select one of a plurality of databases or Data Warehouses and an index of terms for selecting a link in a file of information which is also referred to below as an information template or a file of data on a first network resource which is also referred to below as a server or Document Server. The invention comprises an information template which is a file of data in Hypertext Markup Language (HTML), or other suitable mark up language, such as Dynamic HTML (DHTML) and Extensible Markup Language (XML) or Wireless Markup Language (WML); or any streaming audio and video multimedia format such as Internet Protocol version 6 (IPv6); Microsoft's Active Streaming Format and Advanced Streamning Format (ASF); Real Audio; MPEG, Layer 3 (MP3); Internet Engineering Task Force (IETF) proposed standard Real-Time Streaming Format; Synchronized Multimedia Integration Language (SMIL); International Telecommunication Union's (ITU) T. 120 standards for data conferencing and videoconferencing and Apple's Quick Time; or any graphics format such as Graphics Interchange Format (GIF); Joint Photographics Experts Group (JPEG or JPG); Portable Network Graphics (PNG); Vector Markup Language (VML) or Precision Graphics Markup Language (PGML) embodying text, audio, graphics, and/or video elements, containing Linked Terms and posted in the preferred embodiment on a HyperText Transport Protocol (HTTP) server (the "Document Server"), which is connected to a network. The information template can be a document specifically prepared for publication on the World Wide Web; a newsletter; white paper; or other document which has been printed, but converted into HTML.

The hypertext links in the information template contain the HTTP or other network protocol addresses to a second HTTP server on a computer network. The second server acts as an application proxy server (the "Application Server") to both the client application and a third HTTP server on a computer network connected through a database interface application running on a server to a Data Warehouse or database containing multimedia information searchable by the database's or Data Warehouse's proprietary search engine (the "Database Server"). When a user clicks on the hyperlinks appearing in the window of the browser, he or she will be in simultaneous interactive communication with both the Application Server and the Database Server across the network.

The Application Server runs a computer application that uses gateway protocols, such as the Common Gateway Interface ("CGI"). The application includes look-up tables, hash table, associative array or linked list that comprise authentication data for access to, and the network addresses of a plurality of Database Servers. The application will also contain in its look up tables, hash table, associative array or linked list queries (such as Boolean search terms, date and field restrictions and connectors) that have been formulated by expert judgment to return the optimum results from the Data Warehouse's proprietary search engine, and any other necessary information to authenticate a user, gain access to the Database Server, and run a search in the Data Warehouse's search engine. The CGI application on the Application Server will act as a bidirectional conduit between the Application Server and any application on the Database Server that can accept at runtime some form of HTTP data (for example, standard input (stdin) or environment variables such as QUERY_STRING). In another embodiment of the invention, the Application Server instead of using CGI can use embedded Structured Query Language (SQL) commands to pass the query argument directly to the Data Warehouse. In yet another embodiment, instead of using CGI or embedded SQL, one can use object oriented libraries such as Microsoft's Open Database Connections or Sun/Intersolv's Java DataBase Connectivity-Object Database Connectivity (JDBC-ODBC) Bridge to pass the authentication argument and the query argument.

When the user clicks on any one of the hyperlinks contained in the document on the Document Server, the CGI application on the Application Server will automatically return a set of frames or inline frames, dynamic framesets, layers or fixed or floating pop-up windows, or any combination of the foregoing described in the HTML, to the browser, to which certain information will be targeted in the frames or inline frames, dynamic framesets, layers or fixed or floating pop-up windows, or any combination of the foregoing by the Application Server, or directly by the Database Server or by both the Application Server and the Database Server concurrently.

As a result of the browser's frames or inline frames, dynamic framesets, layers or fixed or floating pop-up windows, or any combination of the foregoing, and the client's simultaneous connection with the Document Server, Application Server and the Database Server, the user will be able to interactively access a range of expert pre-selected individual databases or databases in Data Warehouses linked to the Linked Terms appearing in the frames or inline frames, dynamic framesets, layers or fixed or floating pop-up windows, or any combination of the foregoing of the browser.

FIG. 1 is a block diagram of a typical prior art computer system 100 utilized by a preferred embodiment of the present invention. Computer system 100 may be a general purpose computer or a specially designed computer having features or capabilities equivalent to those described below in relation to computer system 100. Computer system 100 comprises an alphanumeric input device, such as a keyboard 120, coupled to a Aprocessing means, such as a Central Processing Unit (CPU) 140, such as an Intel Pentium chip. The input device may also be another computer, or other known input devices. An additional user input device 110 for communicating cursor direction or selection, such as a mouse, trackball, stylus, motion pad, or cursor direction keys may be coupled to CPU 140. CPU 140 is coupled to Read Only Memory (ROM) 142 and main memory 141, which in a preferred embodiment comprises Random Access Memory (RAM). Additionally, input/output device controller 170 and a bus 150 are coupled to CPU 140.

Main memory, which may include RAM or some other volatile storage device, is for storing information and instructions to be executed by the CPU 140. Main memory 141 may also be used to store temporary variables or other intermediate information during execution of instructions by CPU 140. ROM 142, which may be replaced by or used in conjunction with some static storage device, is coupled to CPU 140 for storing static information and instructions during processing by CPU 140. Computer system 100 also comprises hard disk 164, which is a data storage device that communicates with CPU 140 across bus 150. Computer readable removable media 172, such as magnetic or optical disk (including but not limited to magnetic tapes, laser disks, or CD-ROMs or DVDs), may be coupled to an input/output device 171. Data is read from or written to the removable media by the I/O device under the control of the I/O device controller 170.

These media may be used for storage of the various files to be described herein including graphic and text files.

Computer system 100 may also comprise an output device 130, such as a cathode ray tube (CRT) or liquid crystal display (LCD), coupled to the CPU 140 for displaying information to a computer user. In addition, an audio output device 180 which converts digital information to analog information and delivers the output through headphones, speakers, or other well known audio mixing and storage devices such as magnetic tape may be coupled to the bus 150 through the audio adapter 161. Other devices such as graphic (or video) output devices 181 may also be coupled to the bus 150 via a graphics adapter (or a video accelerator adapter) 162, which also can send graphic or video output to output device 130. Network connection or modem 163, or some other output device (Cable, Digital subscriber Line or Satellite) may also communicate with CPU 140 across 15 bus 150. Network connection or modem 163 may communicate with other networks, such as the Internet, extranets, intranets or data processing systems 183 across communication line 182.

It is to be noted that the following discussion of various embodiments discussed herein will refer specifically to a series of routines which are generated in a high-level programming language (e.g., the PERL interpretive language, Java, Active X, C++, etc.) which is interpreted and/or executed in computer system 100 at run-time. These further are used in conjunction with the browser and server software available from Netscape, Microsoft and other producers of graphical browsers that communicate through network protocols such as HTTP, as described above. It is also to be noted, however, that the following methods and apparatus may be implemented in special purpose hardware devices, such as discrete logic devices, large scale integrated circuits (LSI's), application-specific integrated circuits (ASIC's), or other specialized hardware, or implemented by combinations of the computer components with other non-computer components, such as Microsoft's Web-TV, or reduced capacity computers, such as Sun Microsystems, Inc.'s ("Sun Microsystem's") Network computer, which can consist of a web browser, a network connection, 4MB to 8MB of memory and a display screen. The description here has equal application to apparatus or programming languages having similar function.

Figures 2, 3:
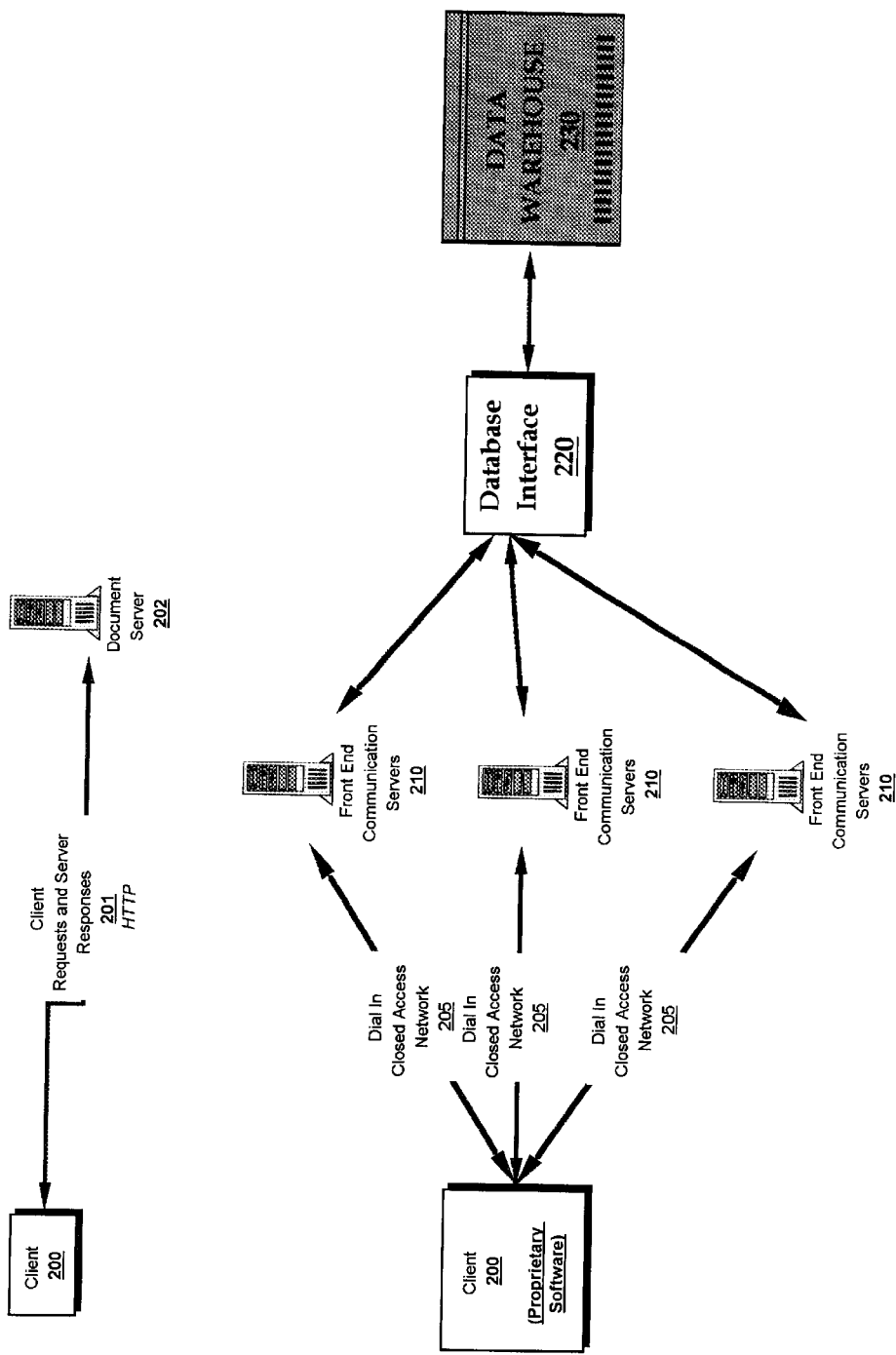
FIG. 2 illustrates a simple client/server system of the prior art.
FIG. 3 illustrates a more complex client/server system of the prior art.

FIG. 2 illustrates a simple client/server system of the prior art in which a single, bi-directional communication line establishes a connection between a client and server across a network. The client is an application program that establishes connections over a network for the purpose of sending requests and receiving responses. The server is an application program that accepts connections in order to respond to requests sent by the client. A connection is a transport-layer virtual circuit established between two application programs for the purpose of communication.

In FIG. 2, client 200 is coupled, by a bi-directional connection 201 to server 202 (typically, a remote computer system accessible over the Internet or other network) which can parse an Internet protocol, such as Hypertext Transfer Protocol (HTTP) Client 200 sends requests for information to server 202 by bi-directional connection 201. Server 202 searches for the requested data in its files, finds and retrieves it, and then presents the data as server responses to the client 200 via bi-directional connection 201. As server 202, in a preferred embodiment, operates in an HTTP protocol, it is also referred to as an HTTP document server. HTTP is a communications protocol that supports distributed collaborative information systems over the Transmission Control Protocol/Internet Protocol (TCP/IP) packet based routing system used by the Internet, including TCP/IP version 6.0. It is to be noted that other transport layer application programming interfaces (API's) such as the Component Object Model (COM); Distributed COM (DCOM); IBM's System Object Model (SOM) and Distributed SOM (DSOM) for networks and Java; Microsoft's ActiveX; Common Object Request Broker Architecture (CORBRA) (with enhancements), Sun Microsystem's Java's Remote Method Invocation (RMI) for the Internet, JDBC, Java Interface Definition Language (Java IDL), Java Naming and Directory Interface (JNDI), Java Message Service (JMS), Java Transaction Service (JTS) and Enterprise Java Beans may also be used in the present invention.

HTTP has an open-ended set of methods that can be used to indicate the purpose and location of a request. These methods signal the purpose of a request by using terms such as Simple Mail Transport Protocol (SMTP), File Transport Protocol (FTP), or HyperText Transport Protocol (HTTP). Other methods can use the Uniform Resource Identifier (URI); Uniform Resource Locator (URL); or Uniform Resource Name (URN) to indicate the network resource to which a method is to be applied. A network resource is a network data object or service that can be identified by a URI, URL or URN. An example of a URL is: http://www.example.com/file.html, which provides the address of subdirectory "file.html" on the network resource "www.example.com". A network resource may also be a server, a database or Data Warehouse.

HTTP can also be used as a generic protocol for communicating with other Internet protocols such as SMTP, Network News Transport Protocol (NNTP), FTP, Gopher or Wide-Area Information Services (WAIS). An HTTP message consists of a structured sequence of octets (a set of eight bits) transmitted by the connection.

FIG. 3 illustrates a more complex client/server system of the prior art. The system shown in FIG. 3 will be used to illustrate the flow of information in a typical academic and research oriented on-line service, such as LEXIS-NEMS. In the case of LEXIS/NEXIS, remote users would pay a yearly subscription fee plus stratified hourly charges to access the Data Warehouse run by this on-line service. To access LEXIS/NEXIS, a user dials in from a remote PC using client 200, which includes LEXIS proprietary software, and sends requests via the service's closed-access network 205. Multiple front-end communication servers 210, which can handle more than 3,000 simultaneous sessions during peak business hours and that run and use proprietary applications and standard and non-standard transport protocols, would feed the queries through a database interface 220 to five large multiple virtual systems (MVS)-based operating system servers, which are collectively designated as Data Warehouse 230. The Database Interface 220 is also known as a middleware layer. The middleware manages communication and provides application services between the Database Server 211 and the Data Warehouse 230. The middleware layer can be separate applications running on the Data Warehouse 230, the Database Server 211 or in a high traffic environment, on a separate application server. LEXIS/NEXIS supplements their MVS systems with 120 UNIX-based servers to manage data. All other on-line services such as DIALOG, WESTLAW and BLOOMBERG have similar setups. LEMS/NEXIS is an example of a Data Warehouse, as that term is used herein.

During 1996, all of the on-line services, including the academic and research oriented ones, migrated in varying degrees to the Internet and the World Wide Web (WWW) or simply the "Web". It is anticipated that, in order to provide access to the WWW via the Internet transport protocol HTTP, the major research and academic databases, as well as all new database on-line services, will have to integrate HTTP servers into their front-end communications servers, and convert parts of their data stores into HTML, or use interfaces to convert documents into HTML on the fly. Corporate intranets are also switching to the HTTP protocol and will integrate some form of HTTP servers or HTML conversion "on the fly" to access their legacy databases.

By adhering to the HTTP protocol, a standard is developed that reduces and simplifies the variety of interfaces and gateways used by the on-line services and Data Warehouses to provide widespread access to their data stores. This, in turn, makes it possible to interpose an HTTP server as a application server between the client and the database without additional complicated gateways or interfaces. As used herein, a gateway is any application program that receives data from a browser or other HTTP server and converts it into a form the database can understand. An interface is a software application that interacts with a database or Data Warehouse.

Figure 4:
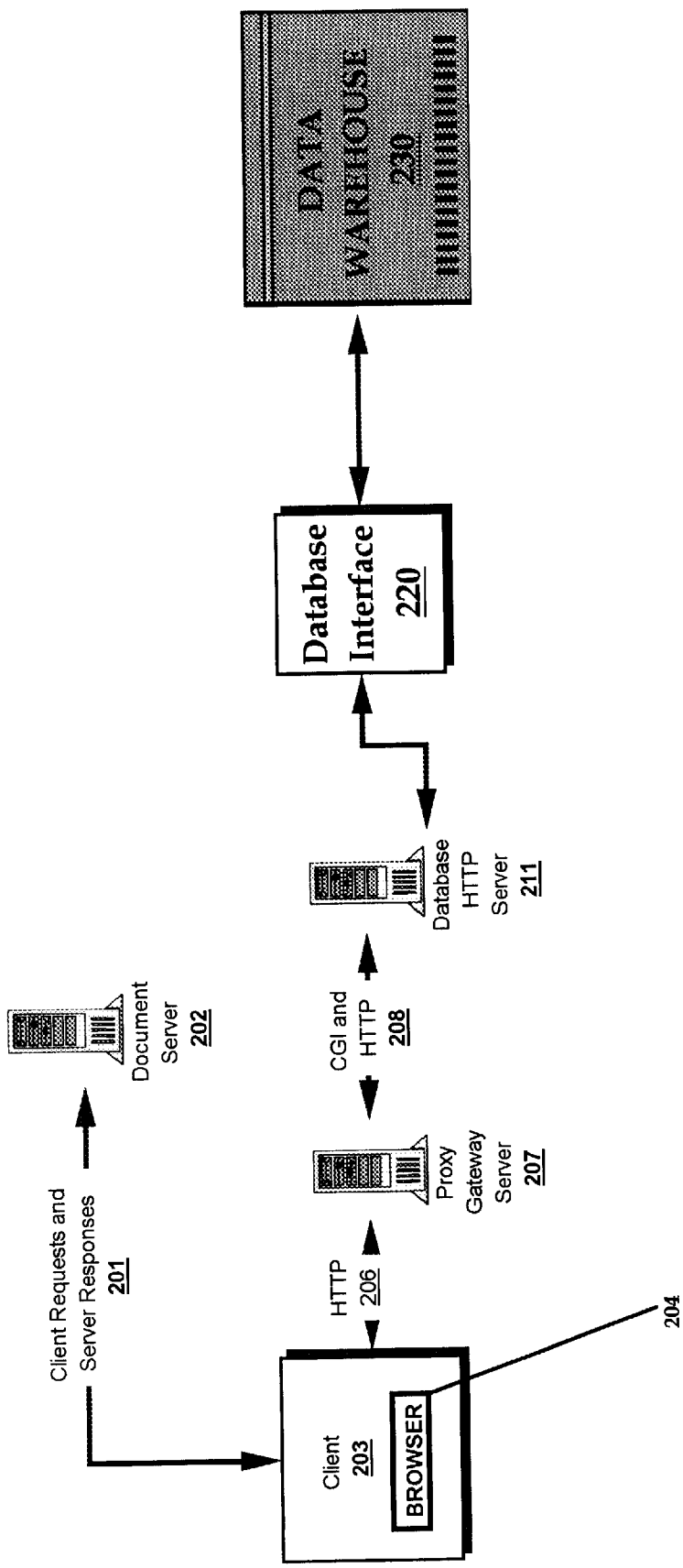
FIG. 4 is a block diagram of one embodiment of the information retrieval system of the present invention.

FIG. 4. is a block diagram of one embodiment of the information retrieval system of the present invention. The informational retrieval system comprises a client 203 which is coupled to a Document Server 202 and an Application Server 207. Active within the client 203 is a first process, known as a browser 204, which establishes the connection, via the HTTP protocol with remote servers. A browser is an application which runs on a client and which can access a variety of servers providing information, including HTTP servers. The Client 203 is coupled to the Document Server 202 by a bidirectional connection 201 through which client 203 sends requests for information (client requests) to and receives information from the document server 202 as described in relation to the system shown in FIG. 2. The Client 203 is coupled to the Application Server 207 by an HTTP connection 206. The Client 203 and the Application Server 207 interactively communicate with each other using the functionality provided by HTTP. The WWW includes all the servers adhering to this standard which are accessible to clients via TCP/IP addressing methods, such as the URL's. For example, communication can be provided over an HTTP protocol used on a TCP/IP network. The client application and server may be coupled via Point to Point (PPP), or Serial Line Internet Protocol (SLIP) for dial up connectivity to the Internet, or by 56 KBPS, ISDN, Frame Relay, Digital Subscriber Line (DSL), Asymmetric Digital subscriber Line (ASDL) or other narrow band, wide band or broad band technology, including T-1, T-2, T-3 or T-4, Wireless, Cable or Satellite for high speed connectivity to the Internet.

Application Server 207 is coupled to a Database Server 211 by connection 208. Application Server 207 and Database Server 211 interactively communicate with each other using the functionality provided on connection 208 by the Common Gateway Interface (CGI) and HTTP via connection 208. The Document Server 202, Application Server 207 and Database Server 211 are typical HTTP servers equipped with varying degrees of memory and hard drive space. At a minimum, an example of a typical installation of each server would consist of a Sun Microsystems Netra workstation running a Solaris 2.5 operating system and employing 32–64 megabytes of memory and 2 gigabytes of hard drive space. The workstation can use the National Center for Supercomputing Applications (NCSA) HTTP daemon or some other comparable software such as Netscape's Enterprise Server as the server software.

Database Server 211 is in turn coupled to a Data Warehouse 230 via Database Interface 220. The Data Warehouse 230 may include one or more databases. The Database Server 211 acts as a front-end HTTP server to data stored in the Data Warehouse 230 or an individual database.

Applications stored and executed on the Application Server 207, known as "server side" applications, can use a Common Gateway Interface (CGI) protocol interface; a CGI protocol interface with vendor added extensions such as Oracle's Web Request Broker; a non-CGI programmic object oriented communications protocols interface, such as Java Servlet application programmer's interface (API), Java applets; or non-CGI programmic server extensions, such as Microsoft's Internet Server API, Netscape API, or Microsoft's Active Server Pages (ASP). For example, ASP allows HTML, scripting languages and activation of other software objects on a single web page as a gateway interface to the Data Warehouse 230 or an individual database. CGI interfaces scripts and programs to an HTTP server. CGI details how clients ask HTTP servers to run a program, how HTTP servers activate the program and pass client parameters to it and how the programs send responses back to the client.

Most CGI programs are written in Perl or Python. It is to be noted that, according to the present invention, one of the aforementioned applications on the Application Server 207, among other things: (1) correlates in a table lookup, hash table, associative array or linked list, a key sent by the browser 204 on client 203 to Application Server 207 with one of a plurality of expert predetermined values (each expert predetermined value comprising a network address for a database or Data Warehouse, a query argument, and an authentication argument); and (2) generates a second request header where the request header comprises a purpose of the request, a network address for a third network resource to which the request header is applied, a file name for an application that is stored and executed on the third network resource, an authentication argument and a query argument, and, if required, modifies a record that satisfies the query argument. Therefore, the application on the Application Server 207 effectively couples a query argument to a request sent by the browser 204 on the client 203 to the Application Server 207.

Additionally, the application preferably couples at least one authentication argument to the query argument and the request. Additionally, the applications on the Application Server 207 preferably cause the browser 204 to subdivide its display into a plurality of frames or inline frames, dynamic framesets, layers or fixed or floating pop-up windows, or any combination of the foregoing, cause a record that satisfies the query argument to appear in the largest of the frames, inline frames, dynamic framesets, layers or fixed or floating pop-up windows, or any combination of the foregoing, cause a series of graphic symbols, e.g., buttons, to appear in a second frame, inline frame, dynamic framesets, layer or fixed or floating pop-up window, or any combination of the foregoing for enabling a user to manually select one of a plurality of databases or Data Warehouses, cause an excerpt of text that includes a link in a file of information to appear in a third frame, inline frame, dynamic frameset, layer or fixed or floating pop-up window, or any combination of the foregoing, and cause information associated with the source of the file of information to appear in a fourth frame, inline frame, dynamic frameset, layer or fixed or floating pop-up window, or any combination of the foregoing. When the user manually selects one of a plurality of databases or Data Warehouses, the application correlates in a table lookup a key, sent by the browser 204 when the user manually selected the database or Data Warehouse, with one of a plurality of expert predetermined values. Additionally, the applications send the second request header to a third network resource, such as Database Server 211. Thus, the applications send a request header in response to the selection of the link or a button and match a key corresponding to the link or button with a second header request. Similarly, the applications send the request, the query argument and the authentication argument to the Data Warehouse 230.

Figure 5:
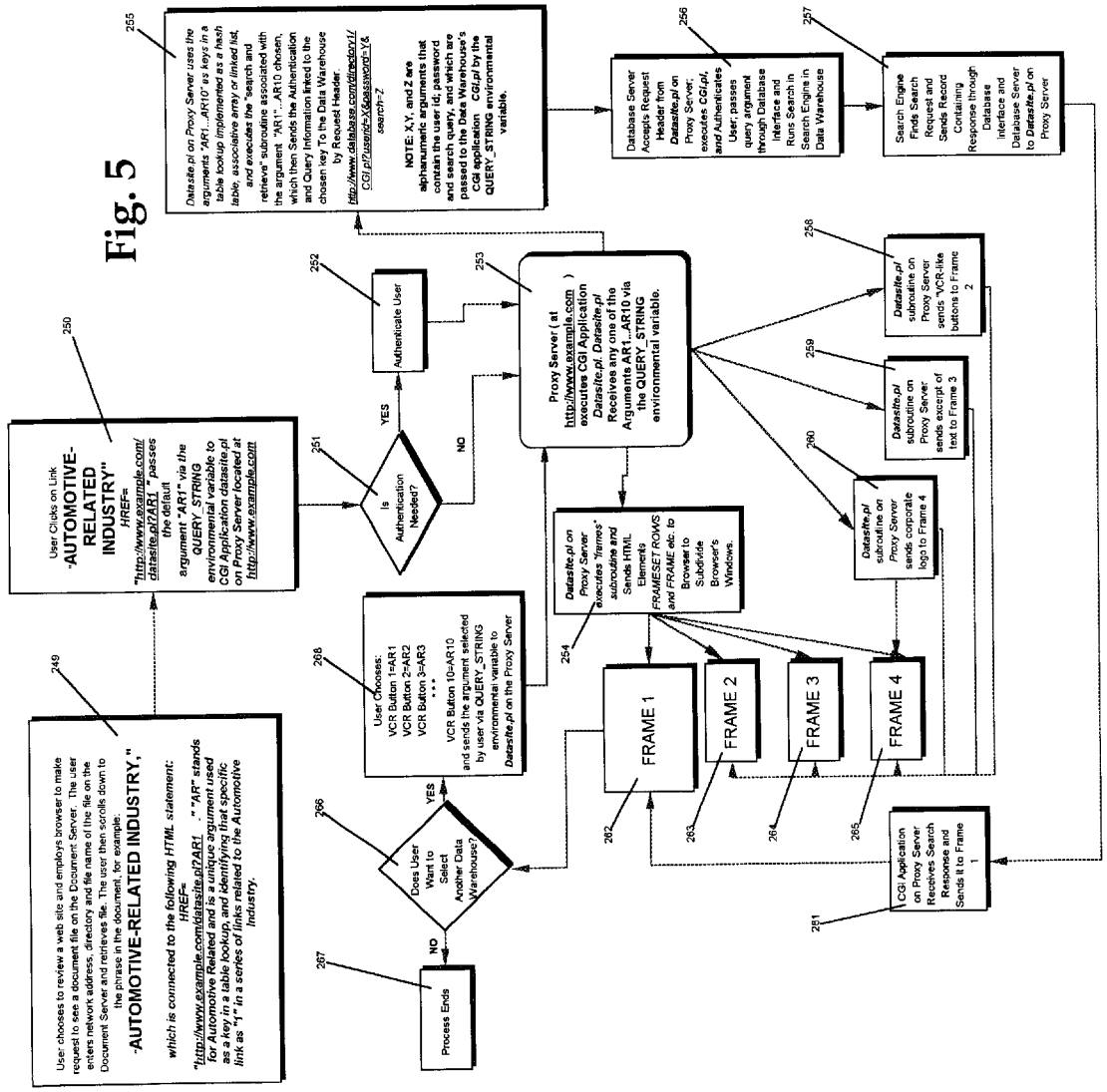
FIG. 5 is a flowchart of a method of operating the information retrieval system of the present invention.

FIG. 5 is a flowchart of the method of operating the information retrieval system of the present invention. At step 249 of the process, the user, employing a browser 204 running on a client 203 (shown in FIG. 4), sends a request via a network protocol such as HTTP for an HTML file to the Document Server 202 (shown in FIG. 4). A typical HTTP statement is in the form http://www.example.com/file.html. The HTML file "file.html" may be an HTML document that will have words, phrases, sentences and paragraphs, or graphics, video and audio elements, each symbolized by an argument abbreviating the name of the term or client (the "Argument Symbol"). The HTML document may be a document prepared for publication on the WWW (including a Web page), a newsletter, or a white paper or other document which has been printed but converted into HTML. In the example shown in FIG. 5, the Linked Term is the phrase "AUTOMOTIVE-RELATED INDUSTRY," and the Argument Symbol that is assigned to it is "AR1". An HTTP network address in the form of http://.Aww.example com/datasite.pl is employed, where "http" is the purpose of the request, "www.example.com" is the address of the Application Server and "datasite.pl" is the name of a CGI application on the Application Server 207 (shown in FIG. 4). The Argument Symbol is added to the end of the HTTP network address after a question mark as shown in FIG. 5 where "AR1" follows the question mark, "?". The HTTP network address and the Argument Symbol, "AR1," constitute the request corresponding to the Linked Term, "A UTOMOTIYE-RELATED INDUSTRY". The request comprises a request header specifying a purpose of the request ("http"), the network address of Application Server 207 to which the request header is applied ("www.example.com"), a file name of an application that is stored on Application Server 207 (" datasite.pl"), and an argument that acts as a key in a table lookup and corresponds to the request ("AR1"). When the user clicks on the Linked Term, "AUTOMOTIVE-RELATED INDUSTRY", it is determined at step 251 whether the user must be authenticated. Thereafter, if there is a need to authenticate the user, the user is authenticated, in a first authentication process, by the Application Server at step 252 before proceeding to step 253. Otherwise, the process is continued at step 253 without the first authentication. Thereafter, the browser passes the request, including the Argument Symbol, to the CGI application on the Application Server 207 (shown in FIG. 4). For example, if the term AUTOMOTIVE-RELATED INDUSTRY is linked to three separate Database Servers, there will be three Argument Symbols AR1, AR2 and AR3 assigned to the term where each Argument Symbol contains the separate network address of each one of the Database Servers. Although FIG. 5 uses as an example Argument Symbols A1 . . . A10, there is in reality no limit to the number of databases to which a Linked Term can be connected, and therefore FIG. 5 should not be construed as a limitation.

The Argument Symbol is used as a key in a table lookup on the Application Server that is implemented as a hash table, associative array or a linked list. The table look up matches the key with the expert-predetermined optimum values for the Database Servers' network address and query.

Thus, browser 204 sends a request to Application Server 207 (shown in FIG. 4). The request comprises a request header which specifies the purpose of the request, the network address of the Application Server 207, the file name of an application that is stored on the Application Server 207, and an argument that acts as a key in a table lookup and corresponds to the Linked Term associated with the request. In a preferred embodiment, the request, including the request header, is sent to the Application Server 207 via a collaborative information systems transmission protocols used on a network which include a combination of Hypertext Transfer Protocol (HTTP) and Transmission Control/Internet Protocol (TCP/IP), including TCP/IP version 6.0.

Alternatively, the argument that acts as a key or the key can be used to create a pop-up or floating window display for viewing by the user. The window display presents the user with a menu of choices for further areas of research pertaining to the key and, therefore, the Linked Terms. Each choice corresponds to an Argument Symbol. The user chooses one of the options presented, which will send an Argument Symbol to Application Server 207 that is used as a key in a table lookup on Application Server 207. The table lookup then matches the key with one of a plurality of expert-predetermined optimum values used to retrieve records from the Data Warehouse or database. Each expert predetermined optimum value includes a network address for the Database Server, a query argument, and an authentication argument. In other words, the user by selecting one of the choices causes an application that is executed on Application Server 207 to match a key, corresponding to the selected choice in the table lookup, with a request header comprising a purpose of the request, a network address for a database network resource to which the request header is applied, a file name for an application that is stored on the database network resource, a query argument and an authentication argument. Additionally, the selection of the choice by the user causes the application that is executed on Application Server 207 to send the request header to the database network resource, e.g., Data Warehouse 230 or a database.

Next, the CGI application is executed, as shown at 253. At step 254, the CGI application finds and sends to the browser the file which contains the HTML code that causes the browser to subdivide its main viewing window into a series of frames 262, 263, 264 and 265 or inline frames, or fixed or pop-up windows, or any combination thereof. Simultaneously, at step 255, the CGI application correlates the Argument Symbol with the network address of the Database Server and the query argument chosen to be inserted in the database's or Data Warehouse's search engine, and sends a request header to the Database Server 211 (shown in FIG. 4). An authentication argument (e.g., a user name and password) and a query argument are coupled to the request (which includes a request header) corresponding to the Linked Term selected by the user. The request header includes a purpose of the request (e.g., http), a network address of the network resource to which the request header is applied, a file name for an application on the network resource to which the request header is applied and alphanumeric arguments that contain the user ID; password and search query 255. (The authentication argument is used to access a database or Data Warehouse that may require authentication prior to allowing access to files or records in the database or Data Warehouse.) Thereafter, the request header, the authentication argument and the query argument are sent to the database or Data Warehouse. In another embodiment, the request header, the authentication argument and the query argument are sent to the Database Server associated with the database or Data Warehouse. Thereafter, the Database Server passes the request header and sends the authentication argument and the query argument to the database or Data Warehouse. If the Database Server performs the authentication, then just the query argument will be sent to the database or Data Warehouse. The Database Server takes the query argument and passes it through the Database Interface 220 (shown in FIG. 4) to the Data Warehouse 257. The Data Warehouse search engines locate the records and send them back through the Database Interface 220 (shown in FIG. 4) and the Database Server 211 (shown in FIG. 4) to the CGI program 261 on the Application Server for further processing, which will be described below.

Figure 6:
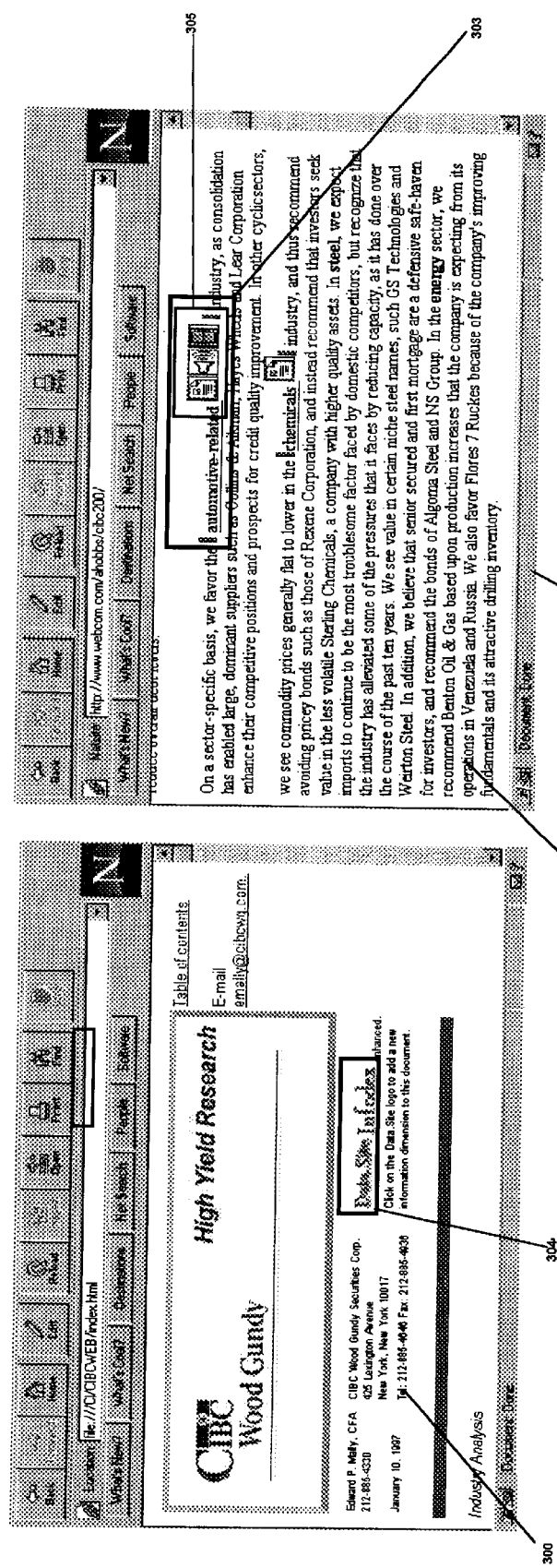
FIGS. 6, 7, 8, 9, 10 and 11 are examples of display screens presented to the user during the operation of the process outlined in FIG. 5.

FIG. 6, shows the resulting view in the browser as a consequence of the Document Server's response to a user's request for a document. Browser window 300 is the initial screen of the document sent by the Document Server 202 (shown in FIG. 4). Browser window 301 shows the same document after the user scrolls down to a Linked Term 303 he or she wants to see. In one embodiment of the invention, such as that shown in FIG. 6, the hyperlinked term can have hyperlinked symbols 305 following immediately after the term which indicate to the reader the properties of the media linked to the Linked Term. For example, a "speaker" symbol will indicate audio content, a "film strip" segment symbol will indicate video and a "document" symbol will indicate text. These symbols could appear singly or in groups depending on the nature and properties of the content connected.

Figure 7:
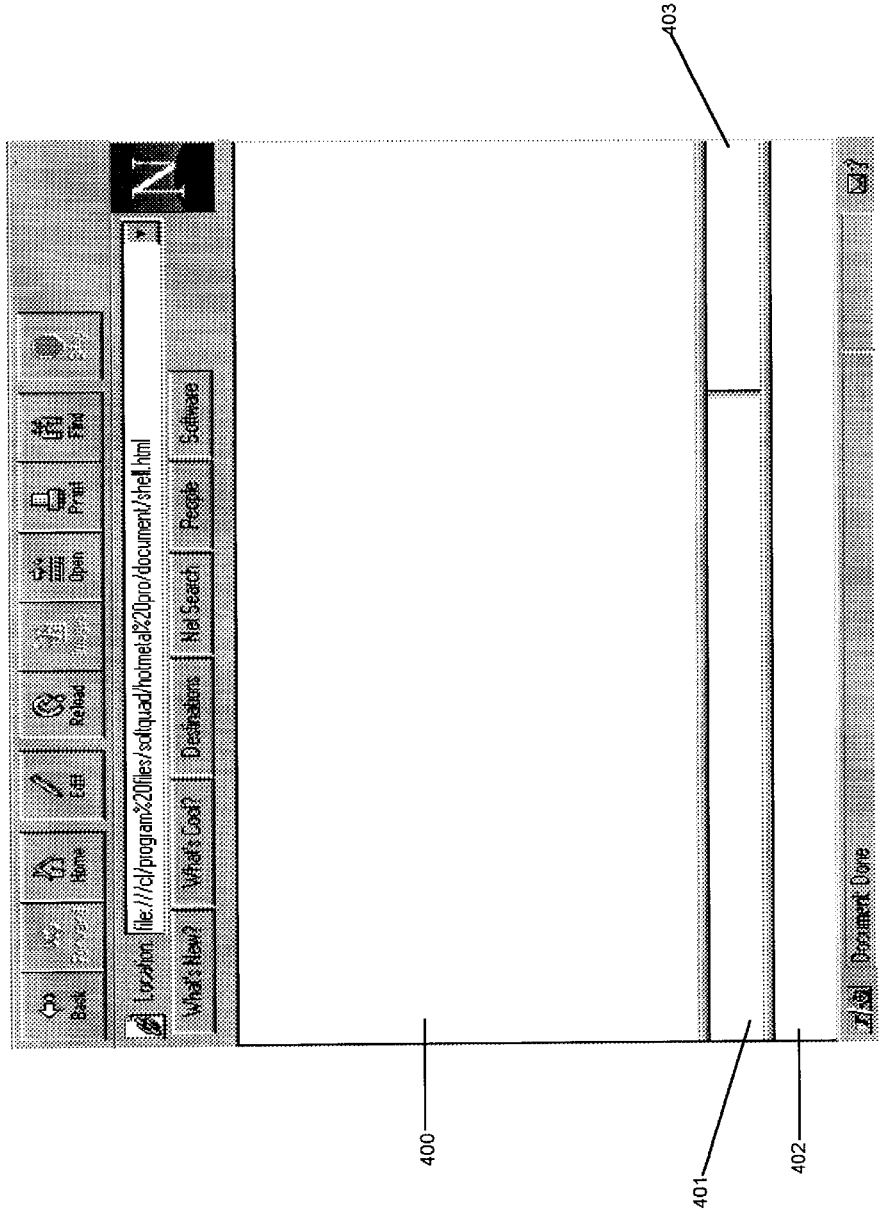

FIG. 7 shows a view of the browser window after it has been divided into four frames. When the user clicks on the Linked Term, the browser sends a request to the Application Server. All or only some of the frames may be scrollable in either an up and down direction, or in a side-to-side direction. The Application Server responds by outputting HTML <FRAMESET> and <FRAME> elements that are described in the CGI application on the Application Server causing the browser's windows to subdivide into four frames 400, 401, 402, and 403 and 254, 262, 263, 264 and 265 (shown in FIG. 5). It is to be noted that the present invention is not limited to subdividing the browser's window into four frames, as shown in FIG. 7. Therefore, in the other embodiments, the browser's window may be divided into any number of frames arranged in any desired way or by inline frames, or by adding to the browser's window a plurality of fixed or pop-up windows, or any combination thereof For instance, as a result of clicking on the link "AUTOMOBILE-RELATED INDUSTRY", the browser sends the request header http./Avww.example.com/datasite.pl?AR1 to the Application Server located at the network address "www. example.com". The Application Server parses the incoming request, and locates the CGI application "datasite.pl". The Application Server then executes "datasite.pl" and outputs HTML <FRAMESET> and <FRAMES> element to the browser 254 (shown in FIG. 5), causing the browser to parse the HTML element. As the browser parses the HTML elements, it causes the main viewing window in the browser to subdivide into four frames 400, 401, 402 and 403. The characteristics of the frames' functionality are as follows:

Each frame can load a network address independently of the other frames;

Each frame can be given a specific name (using the HTML "NAME" tag), allowing it to be targeted by other request headers;

Each frame can resize itself dynamically in response to changes in the size of its visible area, or it can be set to disallow dynamic resizing or manual resizing by a viewer; and The frames can either be standard fixed frames or floating frames.

Each frame may be set to scroll or not to scroll.

Each frame may be an inline frame.

In addition to the frames, the HTML code sent to the client specifies text, audio, graphics or video files (or documents) or some combination thereof, to be pulled in from other directories on the Application Server, and/or from other remote servers across the Internet or within an intranet, and into predetermined nested frames on the client application. The HTML code in the CGI application on the Application Server which calls for the documents from the Database HTTP Server can specify the frames to which the file would be loaded by using the TARGET element and specifying the attribute given to the frame's NAME element.

For example, when the HTML code sent by the CGI application on the Application Server loads into the browser, it may contain a FRAMESET tag, which is nested within a second FRAMESET tag, which is further nested within a third FRAMESET tag.

Each FRAMESET tag is placed in the space that would be used for the corresponding frame if it had been a FRAME tag instead of a nested FRAMESET. When the browser parses the HTML code from the Application Server, the browser will first divide the browser's window into two separate frames in a 78% to 22% ratio (the 78% window is 400 and the 22% window is the sum of the areas of 401, 402 and 403). Next, the browser will subdivide the 22% window into a 47% to 53% ratio (the 53% window is 402 and the 47% window is the sum of the areas of 401 and 403). Finally, the 47% window is further subdivided into a 72% to 28% ratio (the 72% window is 401 and the 28% window is 403).

Figure 8:
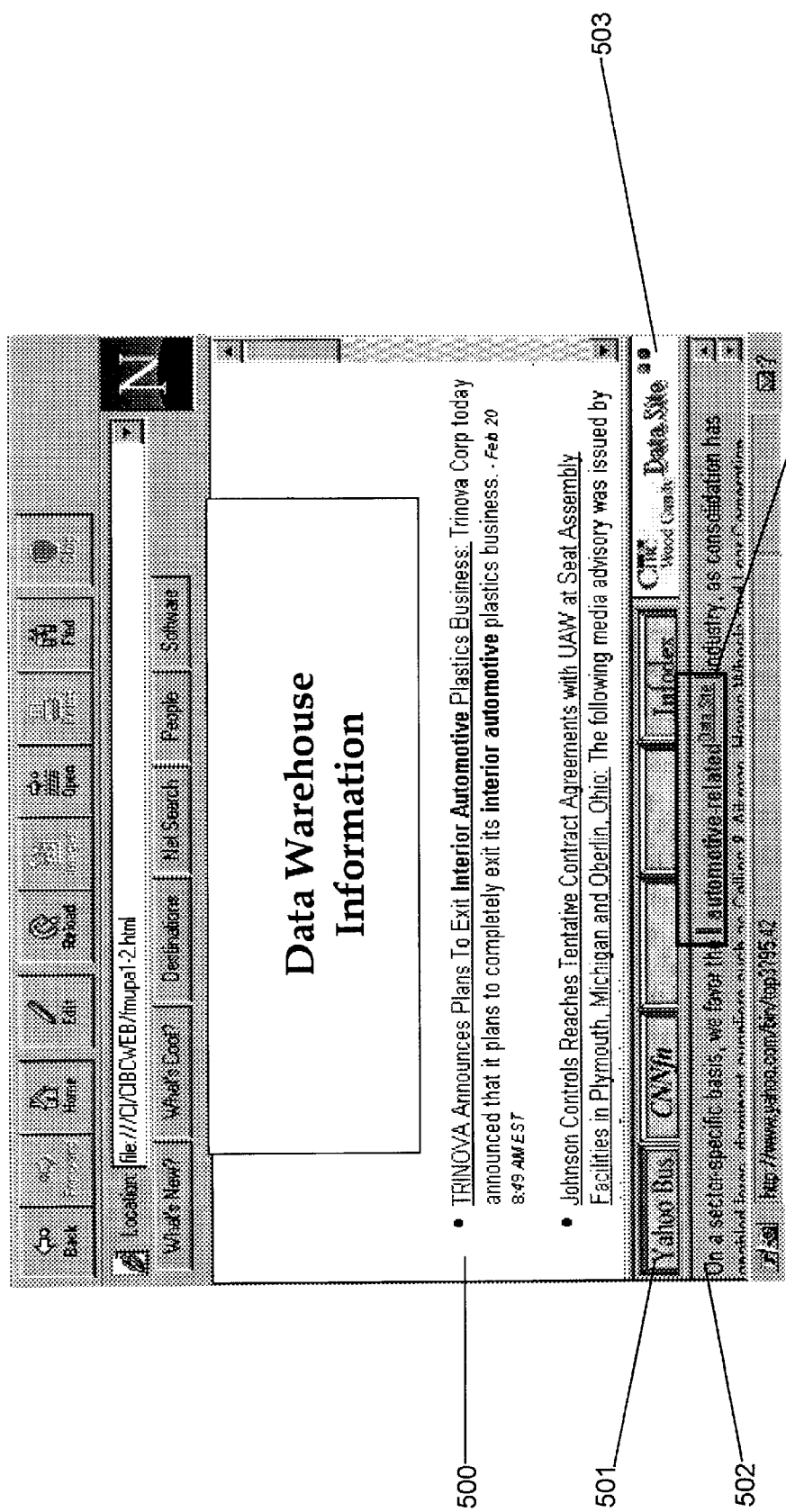

FIG. 8 shows frames 1 to 4 of the browser's window filled with multimedia content received concurrently from both the Proxy Server and the Database Server 258, 259, 260 and 261 (shown in FIG. 5). Frame 1 500 is identified with a named attribute of the FRAME element such as NAME= frame 1, where "frame 1" is the attribute of the element "name". In the present invention, the FRAME element located within the CGI application ("datasite.pl") on the Application Server holds the SRC element (see example below) for the hyperlink, and passes to the Database Server the authentication argument (password and user ID) and the query argument for the Data Warehouse's search engine through a QUERY_STRING environment variable annexed after the "?." The NAME attribute refers to the name of a particular frame (frame 1, frame 2, etc.), and the HTML document referred to in the SRC element is automatically loaded into that named frame. So, the results of the search called for by the SRC element below would be loaded into frame 1 500.

The FRAME elements within the nested FRAMESETS located within datasite.pl look like this: <FRAMESET ROWS="78%,22%">
    <FRAME

```
SRC="http://www.database.com/directory 1/CGI.pl?
    userlD=X & password=Y & SEARCH=Z
<FRAMESET ROWS="47%,53%">
<FRAMESET COLS="72%,28%">
<FRAME
    SRC="up1-a1~1.html"   NAME="frame2"
    MARGINWIDTH="1"  MARGINHEIGHT="1"
    SCROLLING="NO">
<FRAME
    SRC="cibc12~1.html"   NAME="frame4"
    MARGINWIDTH="1"  MARGINHEIGHT="1"
    SCROLLING="NO"></FRAMESET>
<FRAME
    SRC="1nk-12~1.html"   NAME="frame3"
    MARGINWDTH="1"  MARGINHEIGHT="1"
    SCROLLING="AUTO"></FRMASET>
<NOFRAMES>
```
where "www.database.com" is the URL of the database; "directory 1" is the directory on the server where the CGI application is located; "CGI.pl" is the Data Warehouse's CGI application located on the Database Server and X, Y and Z are the alphanumeric arguments that contain the user ID, password and search query, respectively, and which are passed to CGI.pl by the QUERY_STRING environment variable. The contents called for by the SRC hyperlink "www. database. com" are automatically loaded into frame 1 500; 261 and 262 (shown in FIG. 5). Likewise, the contents called for by the SRC hyperlink up1-a1~1.html would be loaded in frame 2 501; 258 and 263 (shown in FIG. 5); the contents called for by the SRC hyperlink cibc12~1.html would be loaded in frame 4 503; 260 and 265 (shown in FIG. 5) and the contents called for by SRC hyperlink Ink–12~1.html would be loaded in frame 3 502; 259 and 264 (shown in FIG. 5).

It is to be noted that a second environment variable, such as PATH_INFO, can be used to pass data to the CGI.pl application. Furthermore, one can also use METHOD=POST, and pass the data by stdin and "stdout" in the same fashion. Since the CGI application (datasite.pl), and not the browser, makes the request to the Database Server, the user will not see either the passwords or user ID's on the command line of the browser if the QUERY_STRING environment variable is used.

A second embodiment of the invention could include vendor extensions for faster CGI access, for example Oracle's Web Request BrQker, or non-CGI programmic server extensions such as Microsoft's Internet Server API (ISAPI), the Netscape API (NSAPI) or Microsoft's Active Server Pages (ASP).

In a third embodiment of the present invention, the CGI application may be replaced as a means to pass data by employing a non CGI programmic object oriented communications protocol, such as Java Servlet API, in an application performing the table look-up of the ("IS") executed on the Application Server, and have the Java Servlet API communicate data to a Java-enabled Database Server and a Java enabled browser. Such an embodiment would avoid the slowness of passing data through stdin and stdout, OR QUERY_STRING environment variables as is done by the CGI application, thereby speeding up the data transfer process by allowing the application performing the table look-up on the Application Server to run continuously instead of stopping and starting on demand as a CGI application would do, and permitting the server's memory to cache data. The Java Servlet API also permits the servers and client to establish end to end (browser to Application Server to Database Server and back) channel security through Secure Sockets Layer (SSL) or Secure HyperText Transport Protocol (S-HTTP). It would also encrypt all data passing from the client to the Application Server and from the Application Server to the Database Server.

A fourth embodiment of the invention would use a non CGI programmic object oriented communications protocol employing embedded applications, such as Sun Microsystem's Java applets or Microsoft's Active X, containing authentication arguments and query arguments for all the selected databases connected to the document. These embedded applications can be encrypted. For example, the applets would be downloaded from the Application Server 207 to the browser 204, which would permit the browser 204 to independently gain access to the various databases and Data Warehouses without continuously using the resources of the Application Server 207. Presently this is not possible with Java applets since there is a restriction for security reasons on the functionality of the applet. Presently, applets can only communicate to the server from where they were received, which in this case would be the Application Server 207. Applets cannot presently connect to other servers. Also, applets cannot inspect or change files on the local hard drive or spawn other programs, including other applets. However, these limitations are expected to be lifted once certificate based public-key cryptographic systems and digital signature based systems are perfected.

The fourth method and its corresponding apparatus operate as follows. A browser sends a request (which is in the form of a request header), corresponding to at least one link in a file of information on the Document Server to the Application Server. The Application Server, in response to receiving the request, executes an application and sends at least one embedded application, preferably encrypted, to the browser. In one embodiment, the embedded application is Sun Microsystem's Java applet. In a second embodiment, the embedded application is Microsoft's Active X. The encrypted embedded application is executed on the browser and couples an authentication argument and a query argument with the request header. Thereafter, the browser sends the request header, the query argument and the authentication argument to the Database Server. It is to be noted that the authentication argument need only be coupled to the request header and sent to the Database Server if the Database Server requires authentication for providing access to files in the database or Data Warehouse. The browser also causes the database or Data Warehouse to search for records that satisfy the query argument. Simultaneously, the embedded application that is executed on the browser causes the browser to subdivide its display window into four frames or inline frames, or fixed or pop-up windows, or any combination thereof Furthermore, the embedded application that is executed on the browser displays at least one record that satisfies the query argument in the largest of the four frames or inline frames, or fixed or pop-up windows, or any combination thereof. The embedded application also causes a series of graphic symbols (e.g., buttons corresponding to a plurality of arguments for selecting a plurality of databases to appear in at least a second of said four frames or inline frames, or fixed or pop-up windows, or any combination thereof for enabling the user to select one of a plurality of databases. In a preferred embodiment, the embedded application that is executed on the browser, further causes the browser to subdivide its display window into a second set of frames or inline frames, or fixed or pop-up windows, or any combination thereof to replace the four frames. The embedded applications causes a list of index terms to be displayed in at least one of the frames or inline frames, or fixed or pop-up windows, or any combination thereof in the second set of frames or inline frames, or fixed or pop-up windows, or any combination thereof The index terms are for selecting the Linked Term in the file of information on the Document Server.

In one embodiment, the above method further involves determining whether a first authentication of a user is needed for sending the request to the Application Server; and authenticating the user if such authentication is required.

In a preferred embodiment, the request header includes an Argument Symbol that acts as a key in a table lookup that is implemented as a hash table, associative array or a linked list. Furthermore, the embedded application that is executed on the browser correlates in a table lookup the key with one of a plurality of expert predetermined optimum values, where each expert predetermined value includes a network address for a database or Data Warehouse, a query argument, and an authentication argument. Alternatively, the key can be used to create a pop-up or floating window display for viewing by the user. The window display presents the user with a menu of choices for further areas of research pertaining to the Linked Terms where each choice corresponds to an Argument Symbol. The user chooses one of the options presented, which will send an argument that is used as a key in a table lookup in an embedded application that is executed on the browser. The table lookup then matches the key with one of a plurality of expert-predetermined optimum values used to retrieve records from the Data Warehouse or database. Each expert predetermined optimum value includes a network address for the Database Server, a query argument, and an authentication argument. In other words, the user by selecting one of the choices causes an embedded application executing on browser 204 (shown in FIG. 4) to match a key, corresponding to the selected choice in the table lookup, with a request header comprising a purpose of the request, a network address for a database network resource to which the request header is applied, a file name for an application on the database network resource, a query argument and an authentication argument. Additionally, the selection of the choice by the user causes the embedded application executing on browser 204 to send the request header to the Database Server 211 which passes it to the Data Warehouse 230 or a database through the Database Interface 220 (all shown in FIG. 4).

In one embodiment, the expert predetermined optimum values and the keys are stored on the Application Server and are sent to the browser in response to a request to that effect by the browser. Once the browser receives the data, it executes the embedded application and matches one of the expert predetermined optimum values with a key in the table lookup.

In a preferred embodiment, the embedded application executing on the browser sends a request header that includes the following: a) a purpose of the request; b) a network address for a Database Server, a database or Data Warehouse to which the request header is applied; c) a file name for an application stored on the Database Server; and d) a query argument and e) an authentication argument.

The Database Server, in response to receiving the request header, the authentication argument and the query argument, authenticates the user, and passes the query argument to the Data Warehouse 230 or a database through the Database Interface 220 (all shown in FIG. 4). The database or Data Warehouse executes a search and returns to the browser records that satisfy the query argument. In another embodiment, a database or Data Warehouse directly receives a request, an authentication argument and a query argument, authenticates the user, executes a search and returns to the browser records that satisfy the query argument. In one embodiment, an application that is executed on the Application Server or the embedded application that is executed on the browser modifies the record that satisfies the query argument and, thereafter sends the record to the browser. The embedded application that is executed on the browser causes the record that satisfies the query argument to appear in the largest of the four frames or inline frames, or fixed or pop-up windows, or any combination thereof created on the browser's window. The embedded application executing on the browser also causes a plurality of buttons corresponding to a plurality of arguments for selecting a plurality of databases to appear in the second of the four frames or inline frames, or fixed or pop-up windows, or any combination thereof on the browser's window (i.e., the means for selecting a plurality of databases). These buttons include arguments that act as keys in the table lookup with all the keys corresponding to a Linked Term in the aforementioned file of information on the Document Server. The user by clicking on one of the buttons causes the embedded application that is executed on the browser to match the key corresponding to clicked button and causes the embedded application to generate a second request header that includes the following information: a) a purpose of the request; b) a network address for a database network resource (e.g., the Database Server 211) (shown in FIG. 4) to which the second request header is applied; c) a file name for an application stored on the Database Server; d) a query argument; and e) an authentication argument. Additionally, the embedded application that is executed on the browser causes an excerpt of text that includes the selected link in the file of information to appear in the third one of the four frames or inline frames, or fixed or pop-up windows, or any combination thereof on the browser's window. Finally, the embedded application executing on the browser causes information associated with the source of the file of information to appear in the fourth of the four frames or inline frames, or fixed or pop-up windows, or any combination thereof in the browser's window.

It is to be noted that the embedded applications sent to the browser depend on the type of functions that one desires to transfer from the Application Server to the browser. Thus, at one extreme, one or more embedded applications are sent to the browser to allow it to perform all the functions that would otherwise be performed by the applications on the Application Server. At the other extreme no embedded applications are sent to the browser, in which case all the functions that are performed by the applications on the Application Server in the earlier described embodiments (without the transfer of embedded applications from the Application Server to the browser), continue to be performed by the applications on the Application Server. In such an embodiment, the applications on the Application Server would perform the functions performed on the browser by the execution of the embedded application(s). It is also to be noted that the range of functions, transferred from the second network resource (i.e., the Application Server) to the browser, between the above two extremes is also covered within the scope of the present invention. Thus, in one embodiment of the present invention, some but not all of the functions that would otherwise be performed by the applications on the Application Server are served by the browser.

The second FRAME element automatically loads the contents of the first of a series of HTML files into frame 2

501. These HTML files contain the graphic images of button bars, with each button bar linked in its BREF statement to a specific network address of a network resource, such as a Database Server, a database or a Data Warehouse. These button bars alternatively appear in frame 2 501 as "pressed" or "down", or not pressed or "up," every time a viewer presses a button bar. Such actions can be accomplished in HTML code, or C++, ActiveX, Java, JavaScript, Visual Basic computer programs, or other programming languages 268, 263 (shown in FIG. 5).

Of course, it may be appreciated by someone familiar with the art that any graphic image, or selection process or scheme may be implemented as long as it shows the viewer what databases or Data Warehouses have been selected and which ones have not. When a viewer clicks on a button bar linked via an HTTP address to a remote database or Data Warehouse, the HTML file associated with the button bar causes the viewer's browser to make a request for a record from the specified database or Data Warehouse in the same manner as described above for the initial QUERY-STRING request, with the results of the request displayed in frame 1 500. At the same time, the button bar that the viewer has clicked appears in frame 2 501 as depressed, with the remaining button bars appearing not pressed or up. The same process described above is repeated for the other remaining button bars, each time a viewer presses a button bar.

Simultaneously with the initial loading of content in frame 1 500 and frame 2 501, an HTML file located on the Proxy Server, containing the logos of the corporate firm sponsoring the access to the updated information, and the firm which has arranged the access to the database, or any other pertinent corporate logo or information appears in frame 4 503. Finally, also simultaneously with the initial loading of content in frame 1 500, frame 2 501, and frame 4 503, the surrounding 15 or so words to the text which the viewer initially saw and clicked on will appear in frame 3 502. The same Linked Terms in area 303 of FIG. 6 will be highlighted in area 504 of FIG. 8. This frame and link provides the user when he or she clicks on the link, with a means to view the entire document, automatically scrolled to the place where the link appears from the Document Server, as was illustrated in FIG. 6.

It is to be noted when the initial menu of results are returned to datasitepl on the Application Server or the final document that the user chose from the menu is returned to datasite.pl on the Application Server (FIG. 10; 500 and FIG. 11), datasitepl can strip away certain predetermined HTML tags from the document. This facility would be useful, for example, if specific banners or links to other areas of the Data Warehouse need to be disabled before it reaches the user's browser.

The arrangement of frames allows the viewer to view simultaneously the results of his or her search in frame 1 500, determine via frame 2 501 which button was depressed and which database has been selected, observe the corporate sponsor of the service in frame 4 503, and view the surrounding 25 to 30 words surrounding the highlighted text in frame 3 502. By clicking on the highlighted selection in frame 3 504, the user may return to the original full text of the document he or she was viewing and automatically scroll to the exact place in the full text document which the Linked Term occurs.

Figure 9:
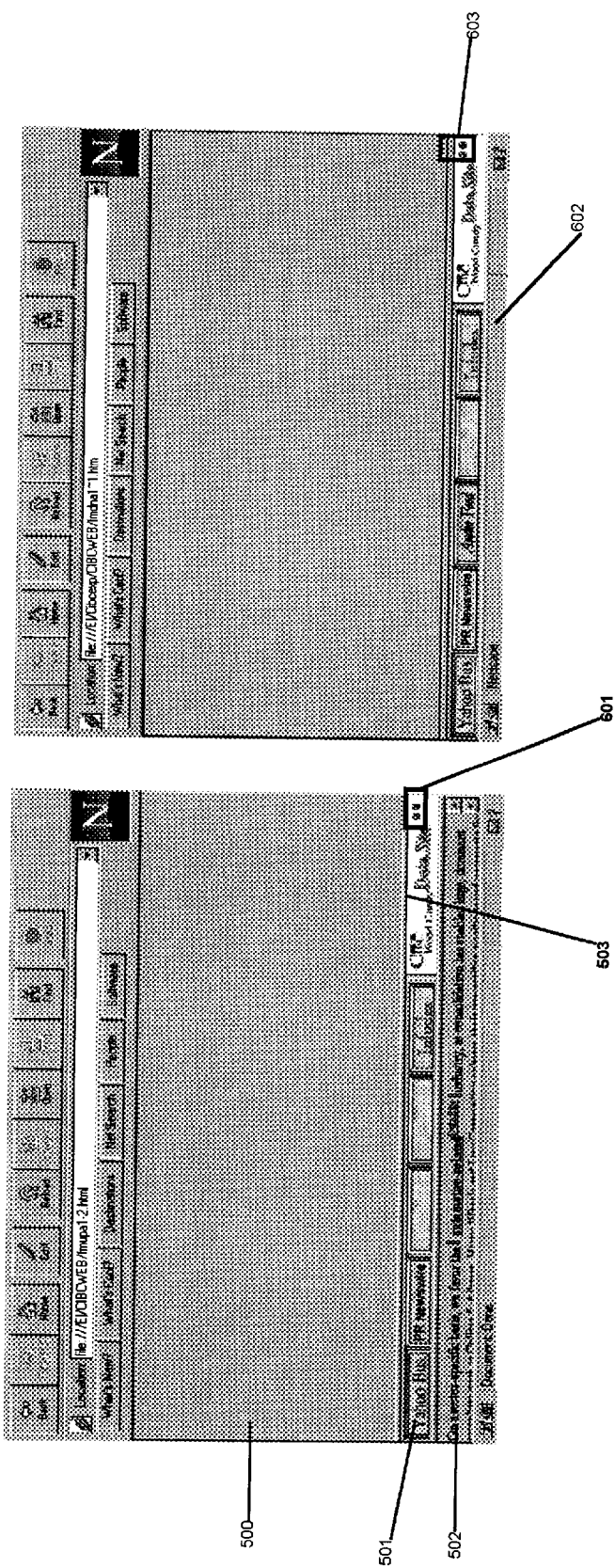

FIG. 9 illustrates a means to enlarge the viewing area of frame 1 500. This may be accomplished through a series of small graphic buttons 601, which when clicked, will cause a window containing only frames 1 500, frame 2 501 and frame 4 503, without frame 3 502 to appear, as shown in display 602. By clicking on another button in Frame 4 603, the viewer may cause frame 3 502 to reappear. Other buttons or graphical devices on the display window may also be used to increase and/or decrease the viewing area of any frame on the display window in a matter well known to those skilled in the art.

Figure 10:
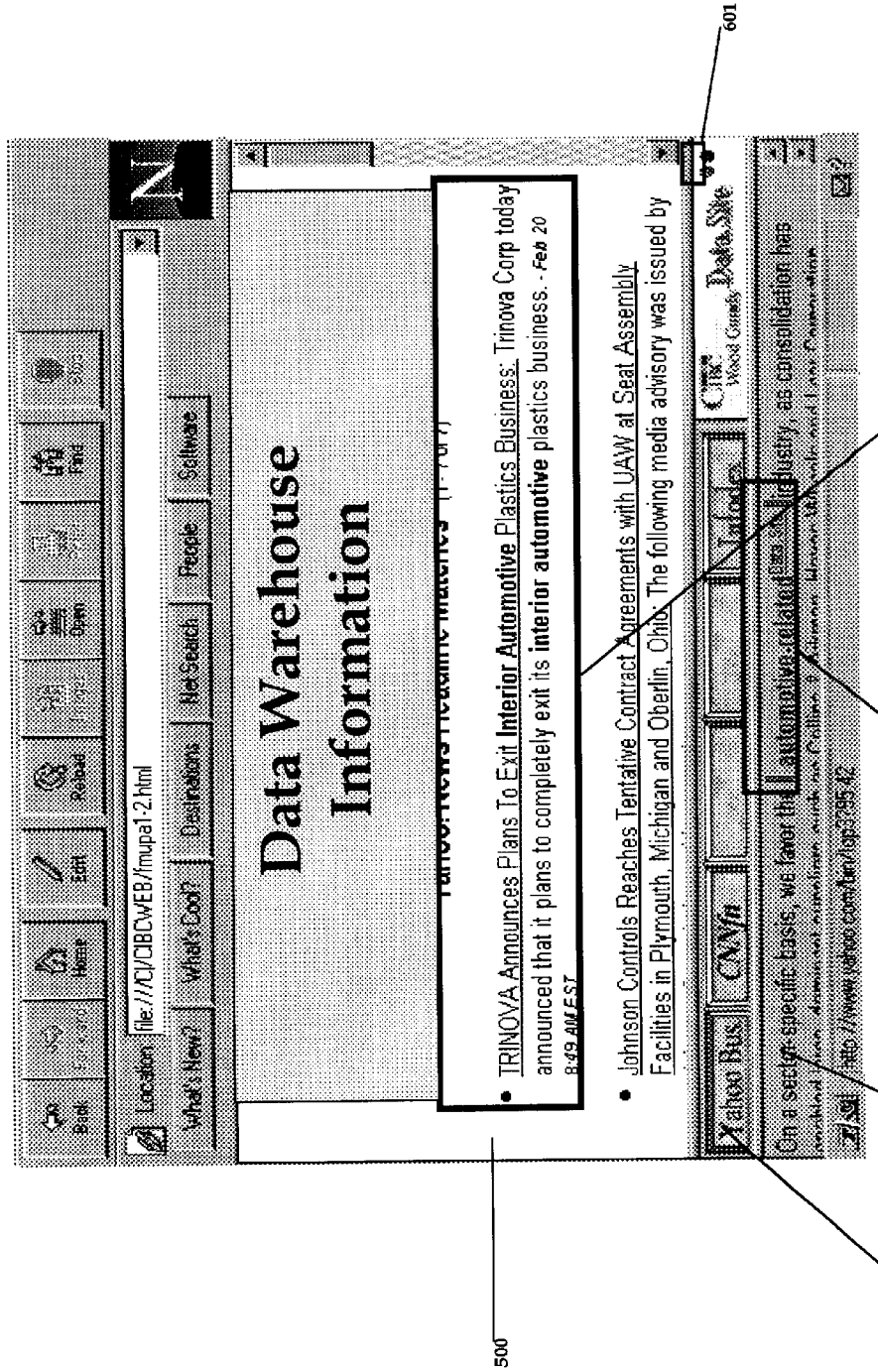

FIG. 10 illustrates the display screen after the user invokes the expert embedded judgment and the database or Data Warehouse returns the results. The user is presented with a menu of choices with a brief summary attached corresponding to a selection of text, audio, graphics or video files or documents from which he or she can choose. The Data Warehouse or database organizes the returned records in a menu format. The user may adjust the screen in the manners described above using the graphic buttons 601 if he or she wishes, or choose a text, audio, graphics, or video document or file from area 500 of the main screen, one such selection being 604. The user may also return to the originating document 502 by clicking on the highlighted Linked Term 504. The user also has the option of choosing another Data Warehouse or database by clicking on any one of the buttons in frame 2 501. Once the user makes his or her choice, the Data Warehouse or database will deliver the document corresponding to the choice in frame 1 500.

Figure 11:
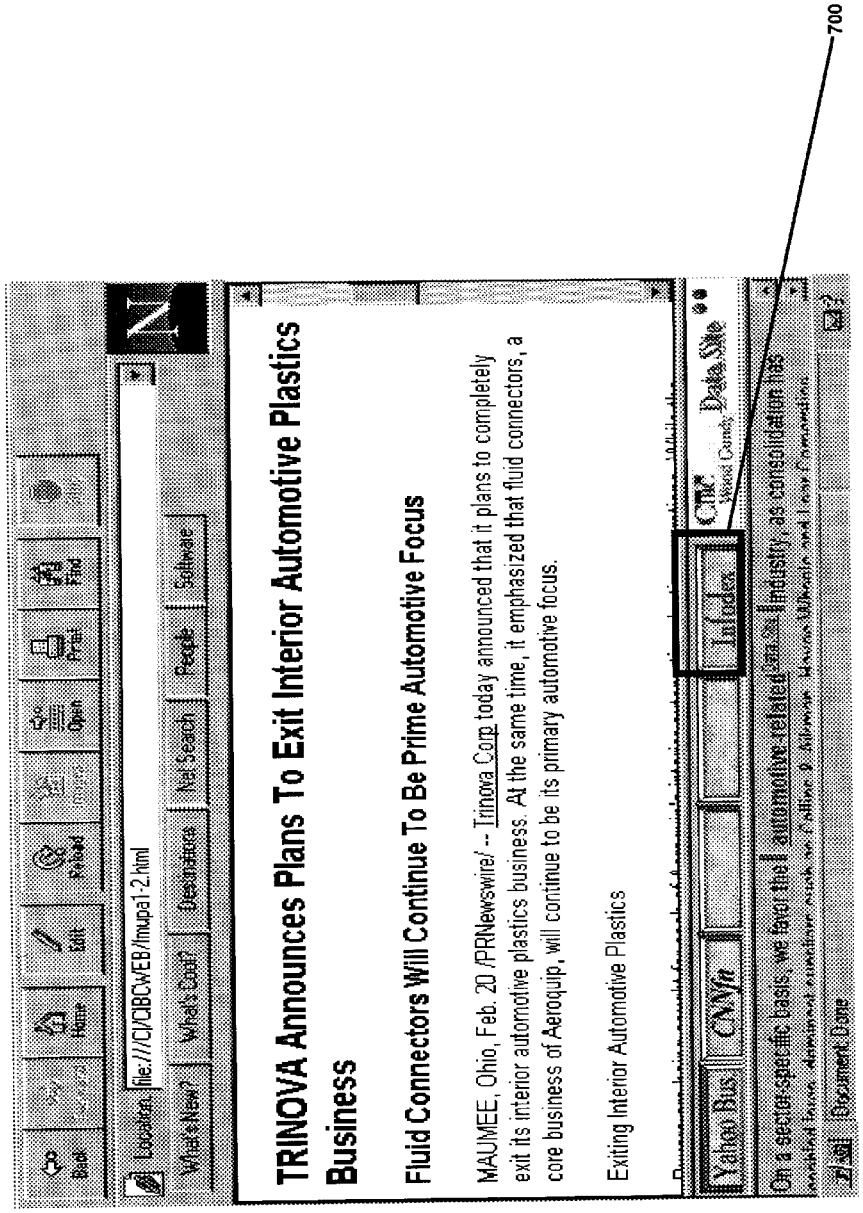

FIG. 11 illustrates the browser's window including the "Infodex" feature of the preferred embodiment of the present invention. An "Infodex" button may be situated either in frame 2 700, or in some other suitable area of the GUI. A second button may be situated on the main document itself. In the embodiment shown in FIG. 6, that button 304 is located just under the masthead of the newsletter. By pressing the Infodex button, a viewer activates a link to the Application Server and makes a request through his or her browser for an HTML document containing two equal frames.

Figure 12:
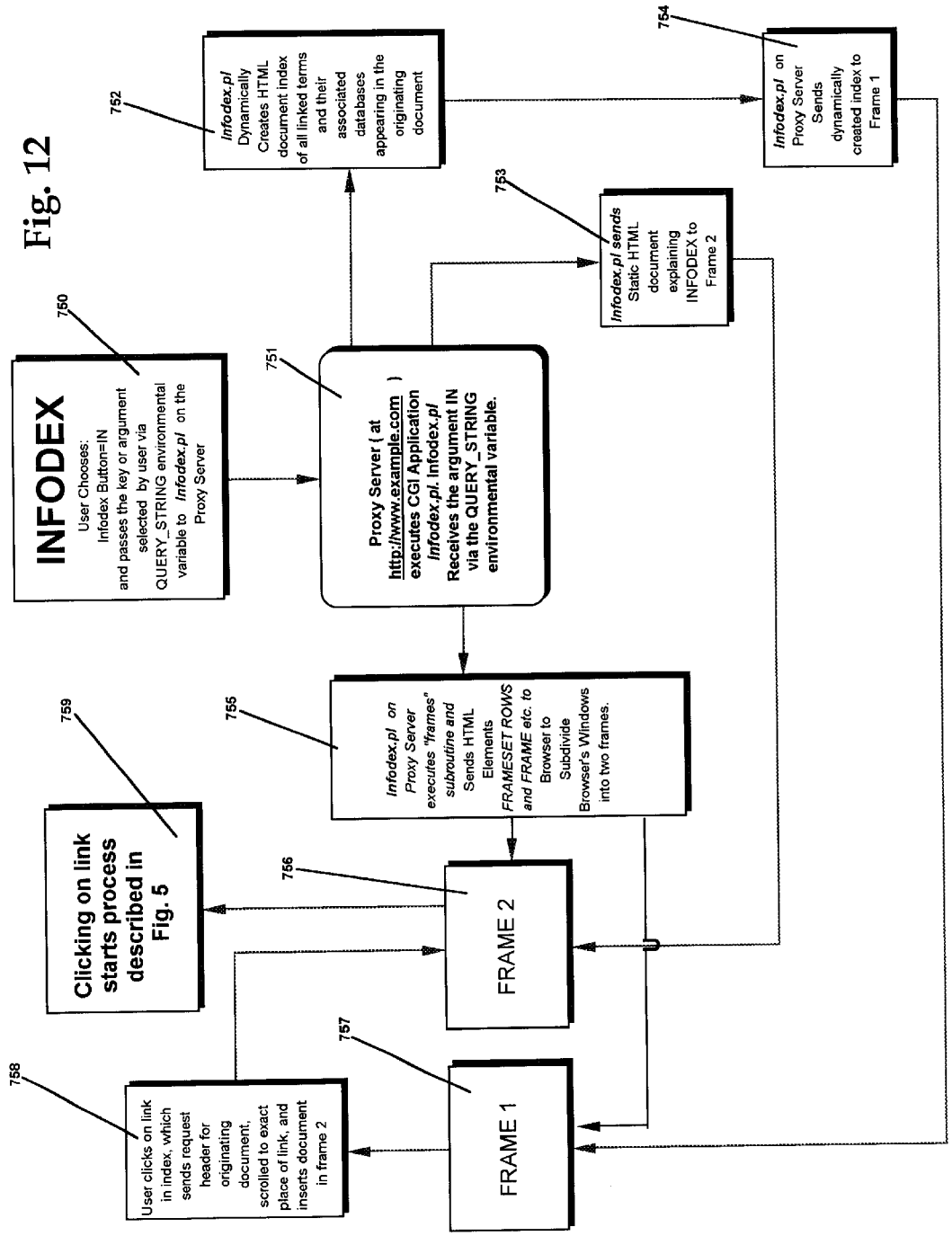
FIG. 12 is a flowchart of the method of operating the "Infodex" indexing process of the present invention.

FIG. 12 is a flowchart of the method of operating the "Infodex" indexing process of the present invention. At step 750 in FIG. 12, the user chooses the Infodex button. By clicking on the button, the user passes an argument by the QUERY_STRING HTTP protocol to the CGI application, infodexpl on the Application Server. At step 751, the Application Server executes the CGI application infodexpl. As a result, at step 752 an HTML document containing an index of all the Linked Terms and their associated Data Warehouses or databases appearing in the originating HTML document is dynamically created. Simultaneously, at step 755, infodex.pl, more specifically, the "frames" subroutine therein, creates two frames, FRAME 1 757 and FRAME 2 756 in the browser's window. At 754, infodexpl then sends the dynamically created index file to FRAME 1 757.

Simultaneously, at 753, infodex.pl sends a static HTML file that explains how to use Infodex or other such useful information to FRAME 2 756. As indicated in block 758, the user can click on a link in the index (in FRAME 1 757) and send a request header to infodex.pl on the Application Server, which then sends a request header to the Document Server. The Document Server then sends the originating document, scrolled to the exact place of the Linked Term to the Proxy Server, or even directly to the browser, if that is desired. If the Document Server sends the file to infodex.pl on the Application Server, infodex.pl will forward the file to the browser and insert it in frame 2. At this point, the user can initiate the process illustrated in FIG. 5 by clicking on the highlighted Linked Term.

Figure 13:
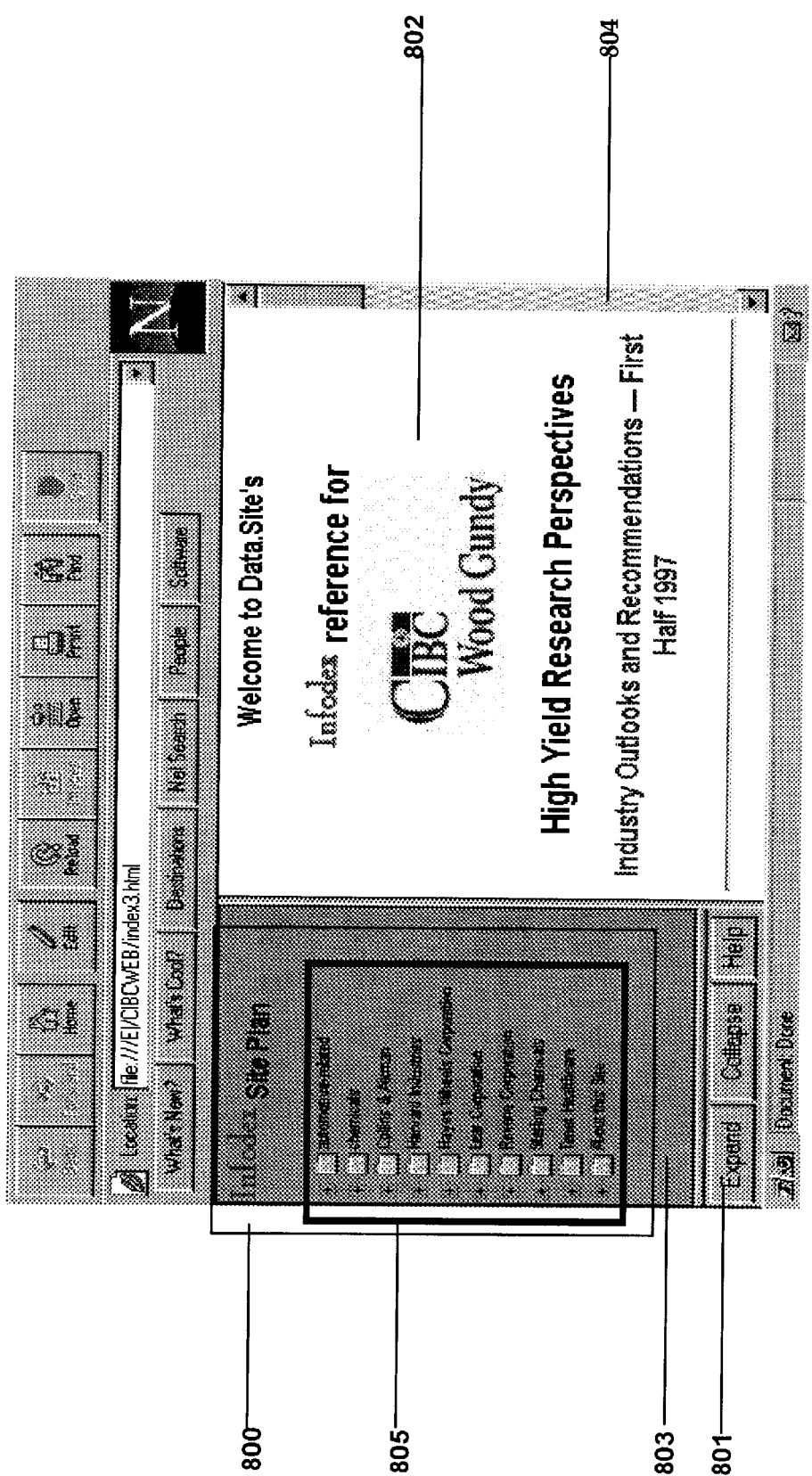
FIGS. 13, 14, and 15 are examples of display screens presented to the user during the operation of the process outlined in FIG. 12.

FIG. 13 shows the browser's window as a result of operating the "Infodex" feature. As a result, left frame 803 is shown after it is automatically loaded with a dynamically created HTML document 800 in HTML created by Java, JavaScript, C++, Visual Basic or ActiveX, or any combination thereof, or any other relevant computer programming language. In document 800 the Linked Terms of the main document are presented in an expandable file tree index 805. By clicking on any one of the words, phrases, sentences or paragraphs with a symbol next to it, or on the "Expand" key 801 at the bottom of left frame 803, a branch of the tree expands below the "parent" limb, revealing on the "child" limb the names of all the Data Warehouses or databases linked to the Linked Terms represented by the "parent" limb.

At the same time, right frame 804 loads an HTML document 802 which explains how to use Infodex or other such useful information. Both the right and the left frames are scrollable in either an up and down direction or in a side to side direction.

Figure 14:
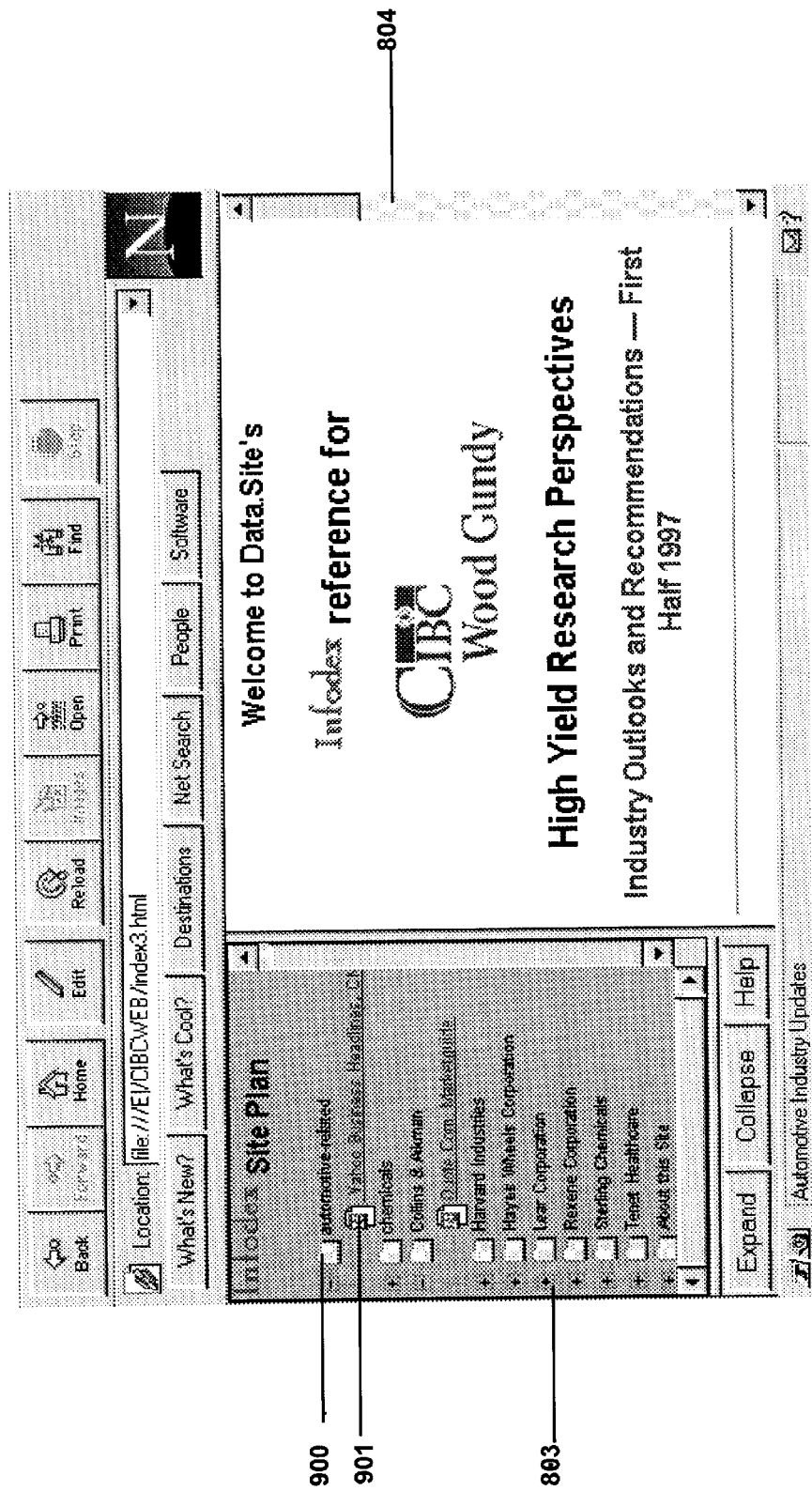

FIG. 14 shows the browser's window including "parent" limb 900 and "child" limb 901 in left frame 803. The viewer may then click the "child" limb 901 in the left frame 803, which causes the viewer's browser to request and load the full multimedia document in the right frame 804 and scroll to the area of the document that contains the Linked Term to the selection in left frame 803.

Figure 15:
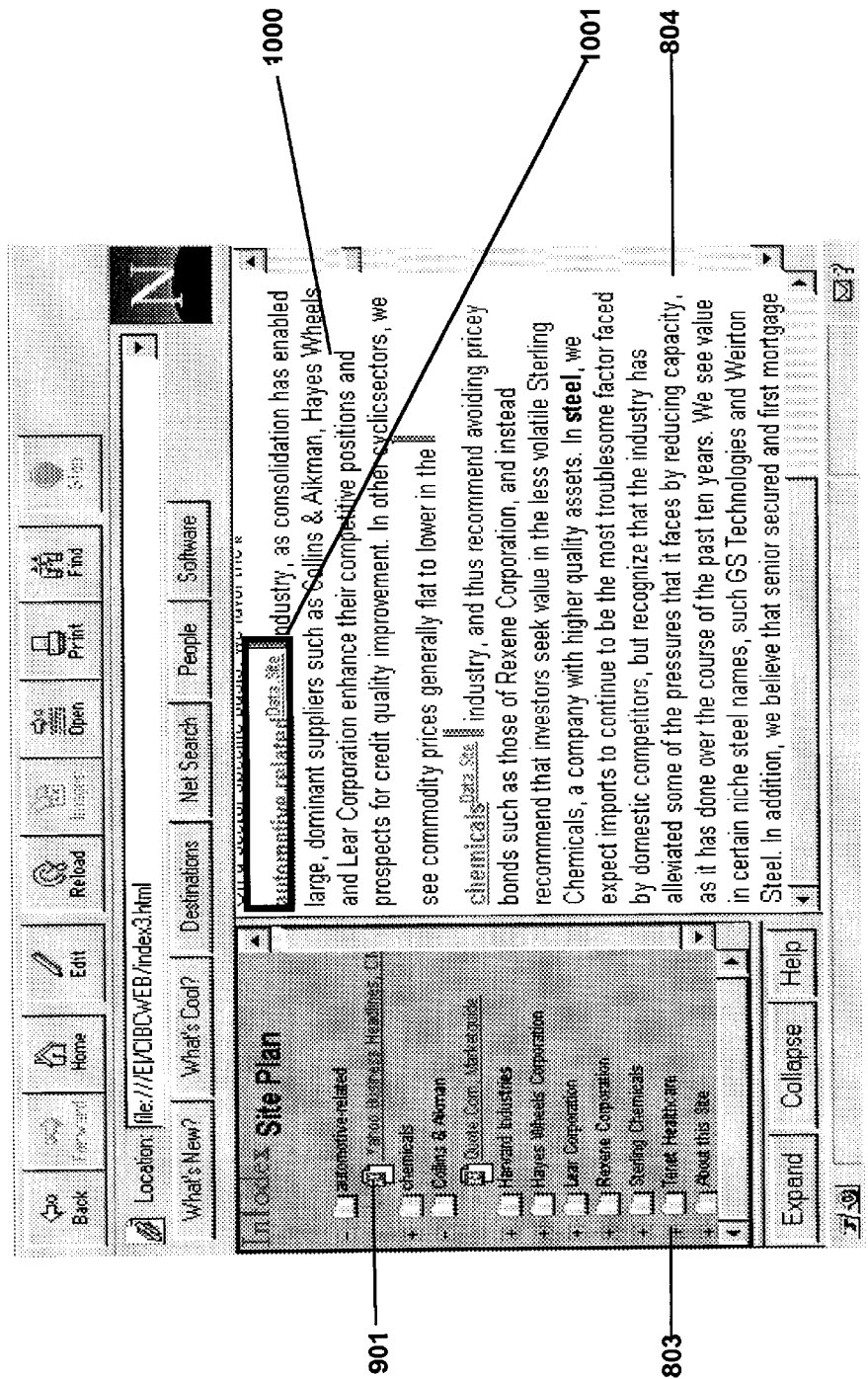

FIG. 15 shows right frame 804 loaded with a document 1000 including Linked Term 1001 which is related to the "parent" whose "child" 901 the viewer clicked on. As shown in FIG. 15, the viewer will be able to see simultaneously, in left frame 803, an index of all the Linked Terms linked to a remote database or Data Warehouse, and in the right frame 804, the full text of the document 1000 scrolled to the Linked Term and its surrounding text. If the viewer chooses, he or she may scroll from the beginning to the end of the entire document 1000 in right frame 804. This document is the same document discussed above and illustrated in FIG. 6, and referenced as document 301. Accordingly, the viewer may click on the Linked Term in document 1000 and activate the same process discussed above and illustrated in FIGS. 4 to 10 above.

Thus, a cost-effective, highly efficient method and apparatus for automatically and continuously updating on demand an HTML document situated on a network resource has been described. Moreover, the method and apparatus has the additional advantages of causing the automatic updating of any document containing a Linked Term with information (current or archived) to expand and add depth and context to any document.

For example, it permits:

Departments within corporations to update critical internal documents, such as 401K plan information, for their employees without labor intensive efforts;

The information services department of corporations to distribute updated information on software used by employees by first describing the software in a text document, and then using the invention to link to any network resource which holds documents pertaining to the update.

A corporation to have its sales force make personal sales calls, distribute print documents at the time of the sales call, and then update those distributed documents over a network, such as the Internet.

Automatic updating of print documents handed out at seminars and conferences.

Physicians to place descriptions of treatments for particular patients suffering from illnesses in password protected areas of a web site, and then have the information on the latest advances of drugs, or the legal status of FDA approval of drug updated regularly.

While the present invention has been particularly described with respect to the illustrated embodiment, it will be appreciated that various alterations, modifications and adaptations may be made based on the present disclosure, and are intended to be within the scope of the present invention. While the invention has been described in connection with what is presently considered to be the most practical and preferred embodiment(s), it is to be understood that the present invention is not limited to the disclosed embodiment(s) but, on the contrary, is intended to cover various modifications and equivalent arrangements included within the scope of the appended claims.

For example, other gateway applications besides CGI, such as Sun Microsystem Incorporated's Java; Microsoft's Internet Server API (ISAPI) and Netscape's API (NSAPI), Java, Java applets, and Oracle's Web Request, may be used for transmission of data between the Application Server any other HTTP server. Also, immediately following the Linked Terms, graphic symbols for audio, video and text may be added to indicate to the reader the properties of the content to which the user gained access. Moreover, once the user accesses the database or Data Warehouse and views the information he or she sought, a window could appear which would allow the user to further refine the search by entering additional search terms and running another search in the database or Data Warehouse. Other embodiments would also include substituting stdin and stdout as a means to pass data through CGI to the Database HTTP Server instead of QUERY_STRING or PATH_INFO environment variables, or using Java, Java applets, Javascript or enhanced CGI as detailed above.

A fifth embodiment of the present invention uses a non-CGI programmic object oriented communications protocol employing embedded applications, such as Sun Microsystem's Java applets or Microsoft's Active X combined and coordinated with a scripted language such as Java Script or VBScript. The scripted language would contain, among other things, the authentication arguments; query arguments for all the selected databases connected to the document; the screen positions for all the windows and frames; and controls for the windows and frames. Both the embedded applications and the scripted language can be encrypted. For example, the applets and the scripted language would be downloaded from the Application Server 207 to the browser 204, which would permit the browser 204 to independently gain access to the various databases and Data Warehouses 230 without continuously using the resources of the Application Server 207. By carefully coordinating the applets with the scripted language, it is possible to have the applet communicate directly with a different server from which it was received, in this case a server different than the Application Server 207, without invoking various restrictions presently placed upon the functionality of the applet when it communicates with a server other than the server from which it came.

The fifth embodiment of the present invention operates as follows. A browser 204 sends a request corresponding to at least one link in a file of information on the Document Server 202 to the Application Server 207. Alternatively, the file of information on the Document Server 202 could have at least one link to a duplicate file of information on the Application Server 207. In this case, the user clicks on a link in the file of information on the Document Server 202, and views a file of information on the Application Server 207 that is a duplicate of the file of information on the Document Server 202. The browser 204 then sends a request corresponding to at least one link in a file of information on the Document Server 202 or at least one link of information in a duplicate file of information on the Application Server 207, as the case may be. The Application Server 207, in response to receiving the request, executes an application and sends at least one embedded application, preferably encrypted, to the browser 204. In one embodiment, the embedded application is Sun Microsystem's Java applet. In a second embodiment, the embedded application is Microsoft's Active X. The embedded application can be sent in combination with a scripted language such as JavaScript or VBScript, also which may be encrypted.

The embedded application can be stored on the Application Server 207 as a class file, or in compressed form as a jar and .cab file, or any compressed file that a browser 204 can download, read and execute. Additional functionality, such as the establishment, control and management of pop-up windows, frames, dynamic framesets and layers and additional button controls in the pop-up windows could added by routines written in scripted languages such as JavaScript and VBScript.

Figure 16:
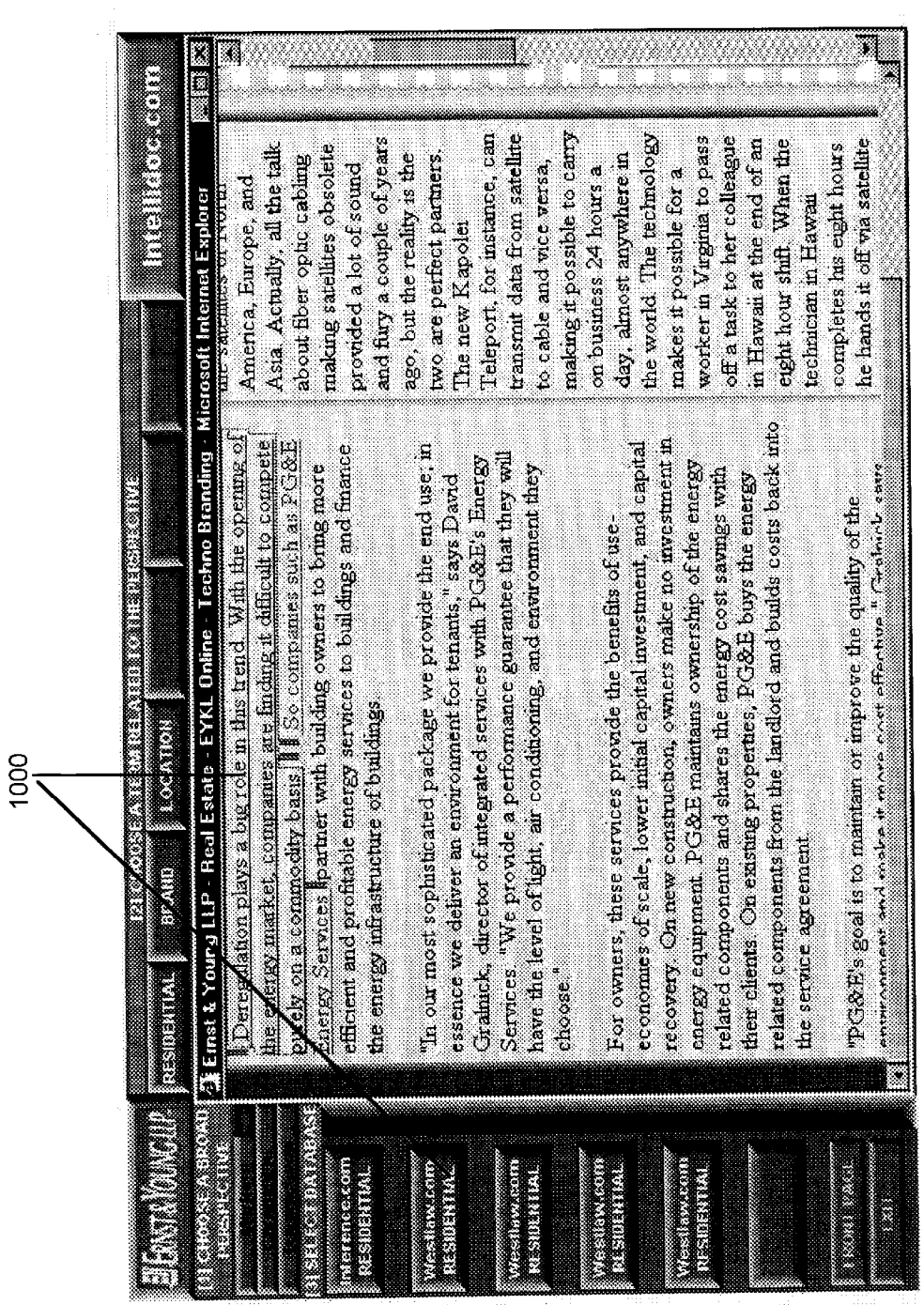
FIGS. 16, 17, 18 and 19 are example screen shots of the browser windows that are presented to the user after the execution of a function by the user.

FIG. 16, shows the resulting view in the browser 204 as a consequence of the Application Server's response to the browser's request. The embedded application will permit flexibility in the arrangement of the appearance of the browser's screen 1000, and could arrange objects (such as a button, screen or animation) in a column or row, or the size and position of each object relative to the screen can be specified. The applet's background can be colored or a bitmap can be used, and the bitmap background can be scaled to fit the applet, or it can be centered or tiled. Each object generated by the applet can be assigned a URL to link to when clicked, and a targeted frame within which to present the content.

The object may have multiple links and multiple target frames that would permit the change in the contents of two or more frames simultaneously with one click of the object. An object, such as a button, can be programmed within the applet to behave as a "Check Box" (each time a button is clicked, it stays depressed with all the other clicked buttons); a "Push Button" (each time a button is clicked, it depresses and then springs up again, and has no effect on any other button); or a "Radio Button" (each time a button is clicked, it depresses and causes any other depressed button to spring to the up position). These behaviors can exist exclusive of one another or be intermixed.

All the objects will have at least three "states"—Up, Down and Mouse-Over—which can be invoked by the applet itself or by a scripted language, such as JavaScript, at any time. A button is in the "Up" state if it is not depressed. A button is in the "Down" state if it is depressed. A button in the "Mouse-Over" state causes an action when the cursor is passed over it. Different colors, bitmaps, sounds and text labels can be assigned to each one of the states. Thus, for example, if an object is a button, a button in its "Up" state can be the color blue and emit no sound; a button in the "Mouse-Over" state can be green and emit a "swoosh" sound when the cursor is passed over it, and a button in its "Down" or depressed state can be red and emit a "click" sound when pressed. Different text styles can be reproduced on the objects, including but not limited to: Bold, Italic, Underlined, Raised and Recessed text. Text on the objects can be aligned to the left, center or right of the object, or it can be offset, and more than one line of text can be included on the object.

Bitmaps can be in GIF or JPEG formats, or any other suitable graphic format, and can be aligned to the left, right or center of the object, or they can be scaled to fit the object.

Transparent GIF's can be used to create non-rectangular objects, and looped and non-looped animations may be created on the objects and may be started and restarted when the object changes its state. Objects which are animated by the applet may be moved to an X Y coordinate of the computer screen, and the applet can specify the number of frames in the animation and the number of milliseconds to wait after each frame. The applet may also resize the object to a new width and height or transform the object to a new position and size. This functionality permits screens of text to slide over one another.

Sounds associated with the objects may be in AU or WAV format, or any other suitable sound format supported by applets, and sounds may be assigned for each of the object's states. The objects may be transparent, flat, or beveled up or down, and beveled objects can be of any depth, with heavy, medium or light shading. Objects generated by the applet may have a border of any thickness or color, and border settings may be different for the object's different states.

Actions performed by an object (such as a button) can be assigned to various events which occur when interacting with the objects, such as entering the object, leaving the object or upon pressing the object. For example, these actions include, but are not limited to showing and hiding buttons, setting the state (Up, Down or Mouse-Over) of a button, and calling a JavaScript or VBScript function. Multiple actions can be assigned to a single event.

The applet's methods to hide and show an object, change the state of an object and move and resize an object may be controlled by JavaScript or VBScript routines. Conversely, the applet may also call JavaScript and VBScript routines. With respect to JavaScript, the applet may call a JavaScript routine in the form of "javascript:functioname(a,b)" or "functionname(a,b)." The applet may also call a JavaScript or VBScript routine by a URL.

The encrypted embedded application and scripted language are executed in the browser 204 and, among other things: (1) correlate in a table lookup, hash table, associative array or linked list, a key sent by the applet with one of a plurality of expert predetermined values (each expert predetermined value comprising the network address for a database or Data Warehouse 230, a query argument, and an authentication argument); and (2) generate a second request where the request comprises a purpose of the request, a network address for a third network resource to which the request is applied, a file name for an application that is stored and executed on the third network resource, an authentication argument and a query argument, and, if required, modifies a record that satisfies the query argument. Additionally, the embedded application and scripted language preferably couple at least one authentication argument to the query argument and the request. Therefore, the embedded application and scripted language effectively couple a query argument to a request in the browser 204 on client 203 (FIG. 4).

Figure 17:
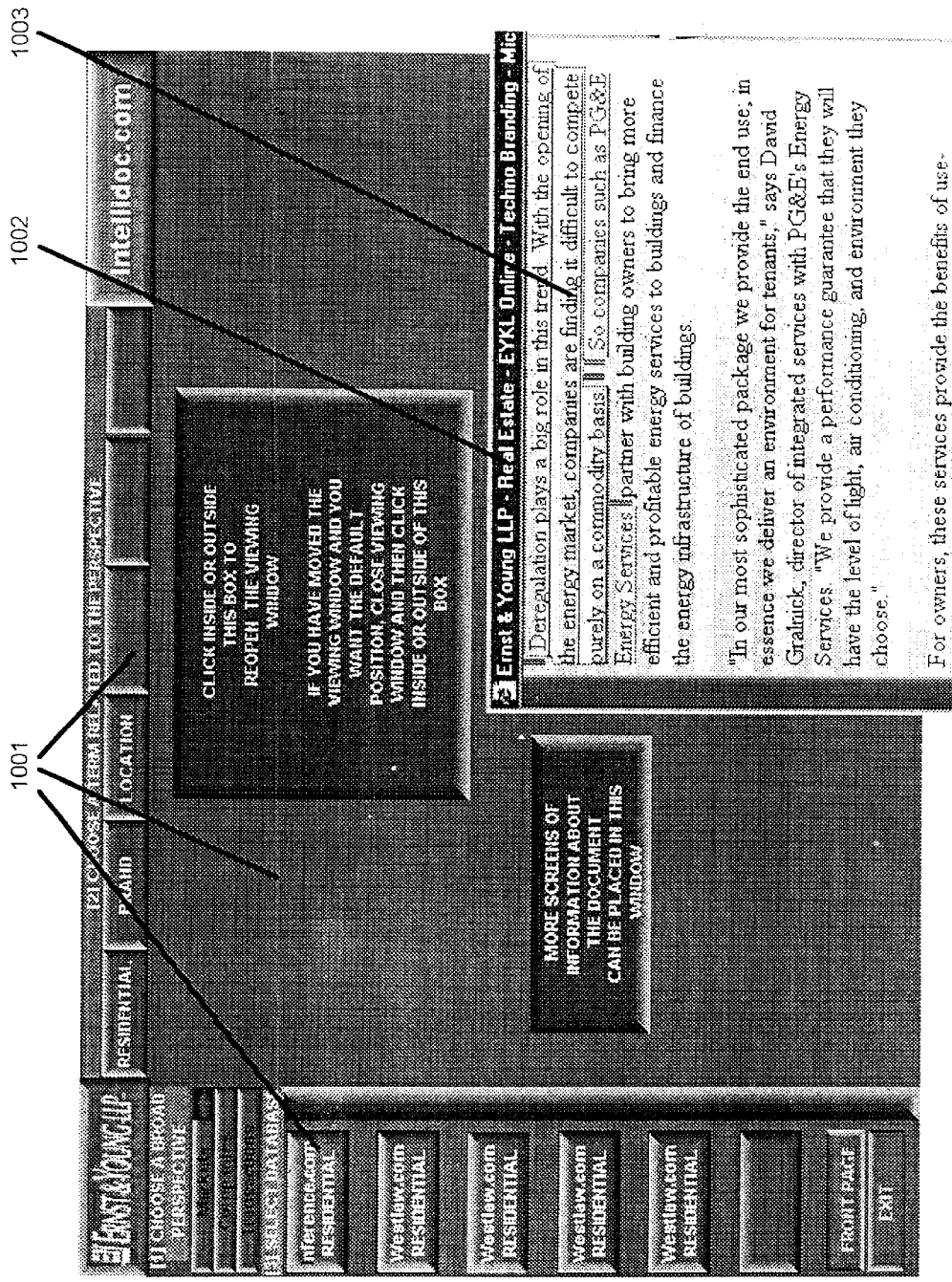

FIG. 17 shows the applet (1001) with at least one additional window, after the central viewing window (1002) is slid to the lower right-hand corner of the browser's screen. This additional window could be a pop-up window, inline frame, dynamic frameset or layer. The embedded application and the scripted language in the browser 204 on client 203 preferably cause the browser 204 to pop up a central viewing window 1002 (smaller than the screen size of the browser) in front of the area of the screen reserved for the applet, which window is initially fixed at a specified X, Y coordinate in the browser window, and which permits a column and row of buttons generated by the applet to be seen at any side of the window Passing a cursor over any of the buttons to the left causes a selection of text from the file of information on the Document Server 202, or the duplicate file of information on the Application Server 207 surrounding the Linked Term to appear in the central viewing window 1003. The window is a semi-modal window, controlled and managed either by the embedded application or the scripted language, or by both. Semi-modal means that it has some characteristics of a modal window (it does not close automatically if one clicks in its background as typical pop-up windows do); yet unlike a modal window, it does not prevent activity in the background from taking place. For example, making a modal window appear in front of an applet would cause any buttons generated by the applet and appearing to the side of the window to freeze until the modal window is closed. In contrast, the semi-modal window permits buttons to be pressed in its background without causing it to close. A simple version of a semi-modal window uses two files and looks like the following:

```
FILE_ONE.html
<!DOCTYPE HTML PUBLIC "-//W3C//DTD HTML 4.0
    Transitional//EN">
<html>
<head>
  <title>Intellidoc Screen</title>
  <script type="text/javascript" language=
     "JavaScript1.2">
  function pop-up(URL, Name, Features) {
var newWin=open(URL, Name, Features);
if (newWin.opener==null)
newWin.opener=window;
return newWin;
}
function launchNewWin( ) {
mywindow=pop-up("FILE_TWO.html", "","height=
    484,width=645");
OnBlur-myWindow.focus( );
}
launcbNewWin( )
</script>
</head>
<body>
</body>
</html>
FILE_TWO.html
<HTML>
<HEAD>
<TITLE>Intellidoc Demonstration</TITLE>
<script type="text/javascript" language="JavaScript1.2">
</script>
</HEAD>
<BODY BGCOLOR="Black" onBlur="window.focus(
    )">
<em><font face="Garamond" size="+5" color=
    "Blue">Intellidoc</font></em>
</BODY>
</HTML>
```

Figure 18:
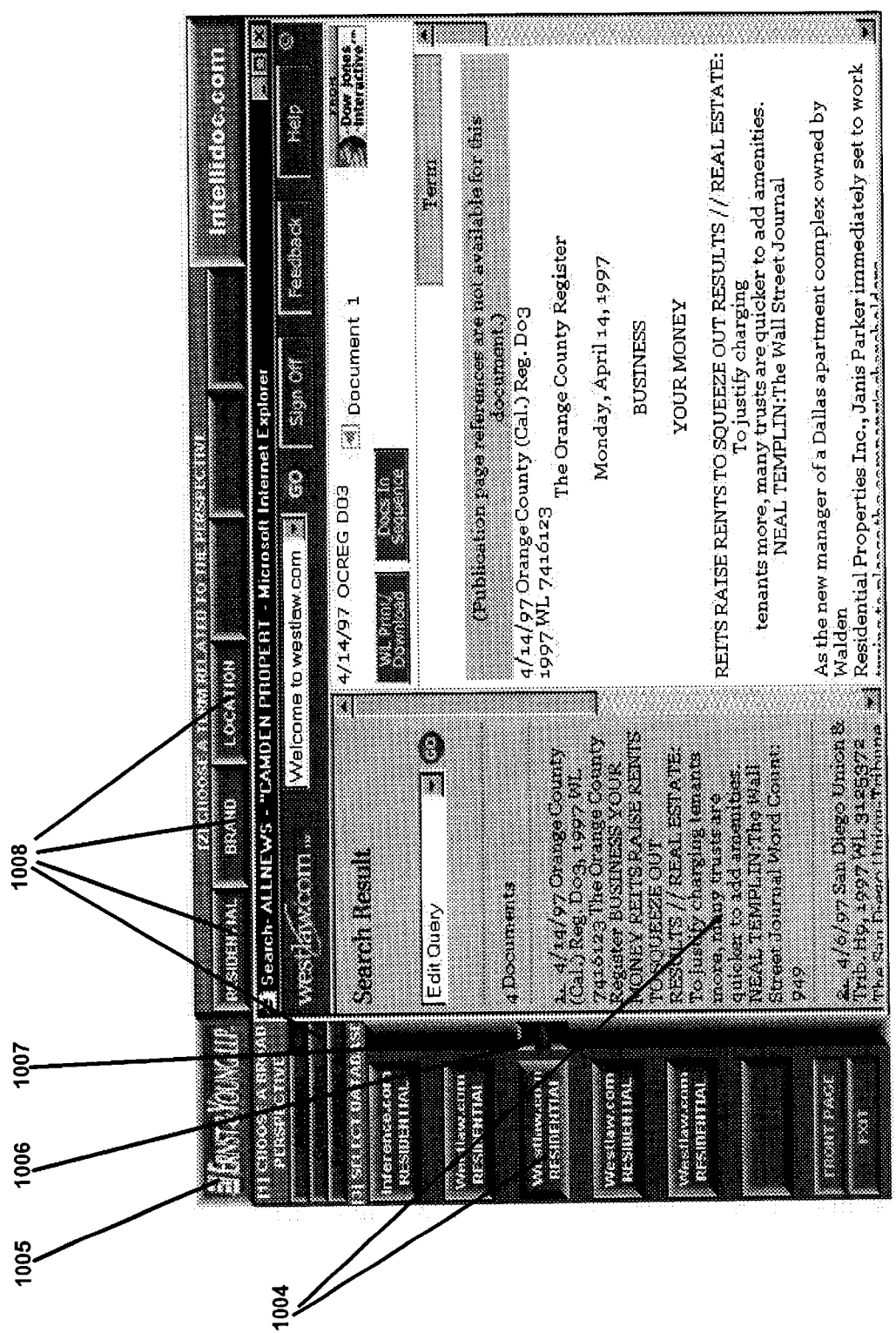

FIG. 18 shows the browser screen after a database or Data Warehouse 230 is selected. The embedded application and the scripted language, together or separately as the case may be, cause a series of buttons to appear on at least one side of the viewing window for enabling a user to manually select at least one of a plurality of databases or Data Warehouses when at least one of the buttons are depressed 1004; cause information associated with the source of the file (i.e., the name of the company that published the document containing the Linked Term) to appear on a side of the viewing window 1005; cause a sliding indicator (such as an arrow) to appear next to the database selected 1006; and cause a button on the indicator 1007 to request the specific text associated with the database from the Document Server 202 or Application Server 207, as the case may be, so that the user can switch back and forth between the selected text (FIG. 17, 1003) and the database or Data Warehouse connected with the text 1004. Additionally, if the user clicks on a selection of text from the file of information on the Document Server 202, or the duplicate file of information on the Application Server 207, all buttons linked to the text will appear in their "Down" state (as if the user had pressed them) and all other buttons will appear in their "Up" state.

In another embodiment of the present invention, at least a second series of buttons will appear along the sides of the viewing window 1008. These buttons, when activated, will organize the buttons associated with the plurality of databases or Data Warehouses under different categories. Thus, if the user chooses the button "Markets" in the upper left hand corner, the buttons "Residential," Brand " and "Location" will appear at 1008. If the user then clicks on the button "Residential," all the database buttons connected to the term "Residential" will appear at 1004. The user can then choose the databases he or she wants to search. Additionally, if the user clicks on a selection of text from the file of information on the Document Server 202, or the duplicate file of information on the Application Server 207, all buttons linked to the text will appear in their "Down" state (as if the user had pressed them) and all other buttons will appear in their "Up" state.

When the user manually selects one of a plurality of databases or Data Warehouses, the embedded application and the scripted language, together or separately correlate in a table lookup, a key, sent by the applet when the user manually selected the database or Data Warehouse 230, with one of a plurality of expert predetermined values. Additionally, the embedded application and the scripted language, together or separately, executing on the browser 204 send a request to a third network source, such as the Database Server 211, that include the following: (a) a purpose of the request; (b) a network address for a Database Server 211, a database or Data Warehouse to which the request is applied; (c) a file name for an application stored on the Database Server 211; (d) a query argument and (e) an authentication argument. The embedded application and the scripted language, together or separately, may also modify a record that satisfies the query.

It is to be noted that the authentication argument need only be coupled to the request and sent to the Database Server 211 if the Database Server 211 requires authentication for providing access to files in the database or Data Warehouse 230. In one embodiment, the user can also invoke the above method by clicking on the highlighted text from the file of information on the Document Server 202 or the Application Server 207, as the case may be, in the main viewer window. In a preferred embodiment, either the embedded application or the scripted language, or both together, that is executed on the browser, further causes a pop-up window to appear under the main viewing window.

Figure 19:
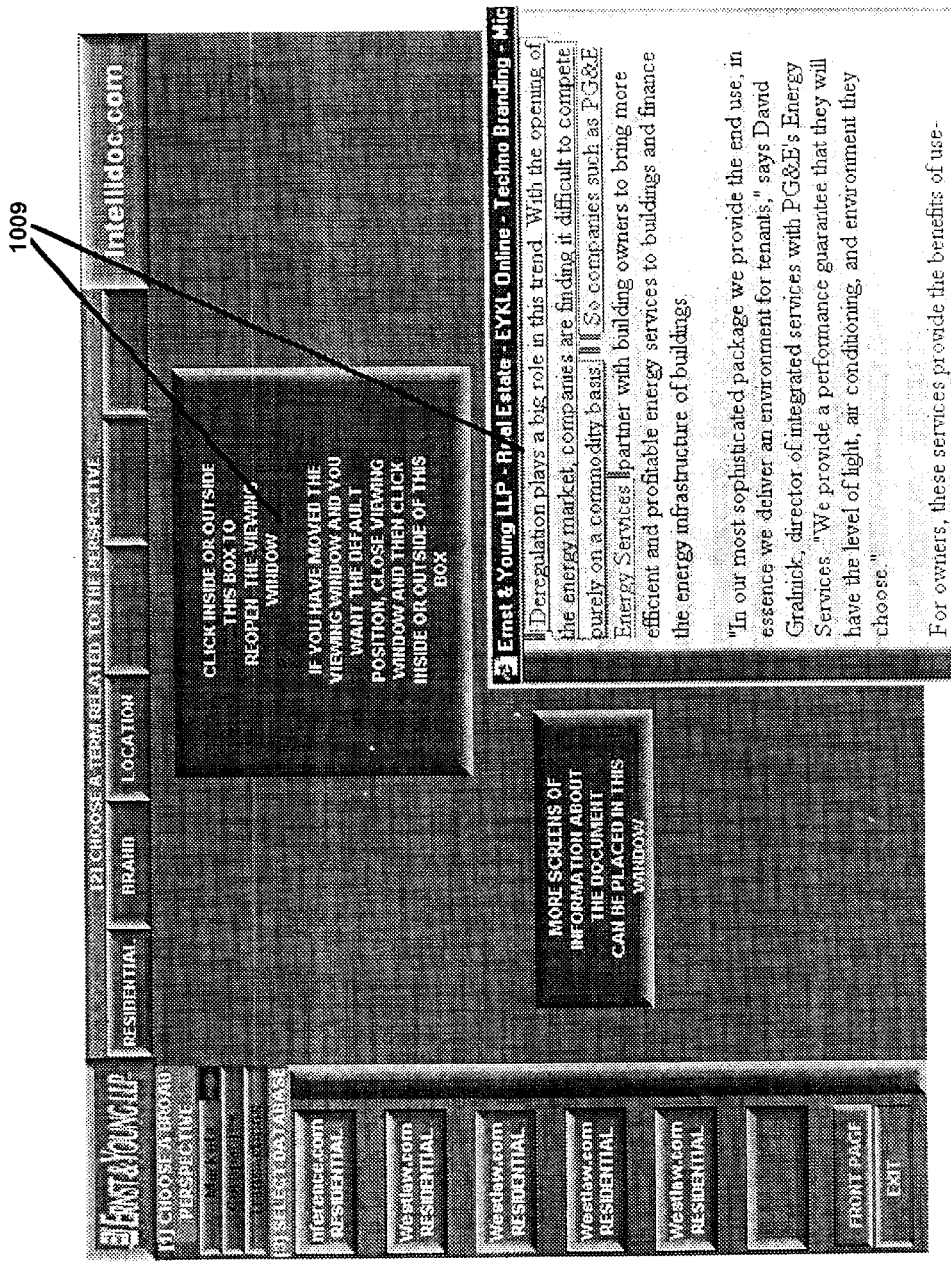

FIG. 19 shows the browser window after the user drags the viewing window to the lower right-hand side. The user may click on the title bar of the main viewer window and drags it to the side to view the pop-up window underneath 1009. The embedded application and scripted language could cause a list of index terms to be displayed in the pop-up window. The index terms are for selecting the Linked Terms in the file of information on the Document Server 202 or the Application Server 207.

It is to be further noted that the embedded applications and scripting languages sent to the browser 204 depend on the type of functions that one desires to transfer from the Application Server 207 to the browser 204. Thus, at one extreme, only one or more scripted language routines and no embedded applications are sent to the browser 204 to allow it to perform all the functions that would otherwise be performed by the applications on the Application Server 207, in which case all the functions that are performed by the applications on the Application Server 207 in the earlier described embodiments (without transfer of the embedded applications from the Application Server to the browser), continue to be performed by the scripted language. In such an embodiment, the scripted language would perform the functions performed on the browser by the execution of embedded applications. The scripted language routines may be encrypted.

At the other extreme, only embedded applications and no scripted language routines are sent to the browser 204, in which case all the functions that are performed by the applications on the Application Server 207 in the earlier described embodiments (without transfer of the scripted language routines from the Application Server to the browser), continue to be performed by the embedded applications. In such an embodiment, the embedded applications would perform the functions performed on the browser 204 by the execution of embedded applications. It is also to be noted that the range of functions transferred from the second network source (i.e., the Application Server) to the browser 204, between the above two extremes is also covered within the scope of the present invention.

The foregoing detailed description of the invention is provided for the purpose of illustration and description and is not intended to be exhaustive or to limit the invention to the precise embodiment disclosed. Although the preferred embodiments of the present invention have been illustrated and described, various modifications thereof will become apparent to those skilled in the art; and, accordingly, the scope of the present invention should be defined by the claims appended hereto.

What is claimed is:

1. A method of dynamically augmenting the contents of at least one file of information on a first network resource, the information file having at least one link, comprising the steps of:
   (a) creating at least one request corresponding to the at least one link;
   (b) coupling at least one query argument with the at least one request;
   (c) sending the at least one request and the at least one query argument to a database;
   (d) causing the database to search for at least one record that satisfies the at least one query argument;
   (e) providing a display for viewing by a user, the display being subdivided into a plurality of displays; and
   (f) displaying the at least one record that satisfies the at least one query argument in at least one of the plurality of displays.

2. The method of claim 1, wherein the subdividing portion of step (e) further comprises the step of overlaying the plurality of displays on the display.

3. The method of claim 1, further comprising the steps of:
   (g) providing a series of symbols in a second of the plurality of displays for enabling the user to select one of a plurality of databases.

4. The method of claim 1, wherein the plurality of displays is selected from the group consisting of:
   windows, frames, inline frames, dynamic framesets, layers and applets.

5. The method of claim 4, wherein the windows further include pop-up windows and fixed windows.

6. The method of claim 3, further comprising the steps of:
   (h) subdividing the display into a second plurality of displays which replace the plurality of displays; and
   (i) providing a list of index terms in at least one window of the second plurality of sections, the index terms for selecting the at least one link in the at least one file of information on the first network resource.

7. The method of claim 1, wherein step (b) further comprises the step of:
   (b1) coupling at least one authentication argument to the at least one query argument and the at least one request.

8. The method of claim 1, wherein step (c) is performed by a browser, further wherein the at least one request comprises a request header specifying: (a) a purpose of the request; (b) a network address of a second network resource to which the request header is applied; (c) a file name for at least one application that is stored on the second network resource; and (d) an argument that acts as a key in a table lookup and corresponds to the at least one link.

9. The method of claim 8, wherein the request header is sent to the second network resource via collaborative information systems transmission protocols used on a network.

10. The method of claim 9, wherein the collaborative information systems transmission protocols used on a network include the combination of Hypertext Transfer Protocol (HTTP) and Transmission Control/Internet Protocol (TCP/IP).

11. The method of claim 8, wherein the second network resource, in response to receiving the at least one request, executes the at least one application and sends at least one embedded application to the browser.

12. The method of claim 11, wherein the at least one embedded application is executed on the browser and causes the browser to subdivide the display into the plurality of windows.

13. The method of claim 12, wherein the at least one embedded application that is executed on the browser causes the at least one record that satisfies the at least one query argument to appear in the largest window of the plurality of windows.

14. The method of claim 12, wherein the at least one embedded application that is executed on the browser causes a plurality of buttons corresponding to a plurality of arguments for selecting a plurality of databases to appear in at least a second window of the plurality of windows.

15. The method of claim 12, wherein the at least one embedded application that is executed on the browser causes an excerpt of text that includes the at least one link in the at least one file of information to appear in at least a third window of the plurality of windows.

16. The method of claim 12, wherein the at least one embedded application that is executed on the browser causes information associated with the source of the at least one file of information to appear in at least a fourth window of the plurality of windows.

17. The method of claim 11, wherein the at least one request comprises an argument that acts as a key in a table lookup and the scripted language or the at least one embedded application is executed on the browser and correlates in the table lookup the key with one of a plurality of expert predetermined optimum values, each expert predetermined value comprising a network address for a database, a query argument, and an authentication argument.

18. The method of claim 17, wherein the key can be used to create a window for viewing by the user, the window presenting the user with a menu of choices for further areas of research pertaining to the key.

19. The method of claim 18, wherein the user by selecting one of the choices causes the scripted language or the embedded application that is executed on the browser to match a key, corresponding to one of the choices in a table lookup, with a request header comprising: (a) a purpose of the request; (b) a network address for a third network resource to which the request header is applied; (c) a file name for an application that is stored on the third network resource; (d) a query argument; and (e) an authentication argument; and causes the embedded application that is executed on the browser to send the request header to the third network resource.

20. The method of claim 19, wherein the at least one embedded application requests one of the plurality of expert predetermined optimum values and a plurality of the keys, associated with the link, from the second network resource.

21. The method of claim 20, wherein the at least one embedded application that is executed on the browser matches one of the expert predetermined optimum values with the key in the table lookup selected from the group consisting of a hash table, an associative array and a linked list.

22. The method of claim 20, wherein the at least one embedded application that is executed on the browser generates at least a request header comprising: (a) a purpose of the request; (b) a network address for a third network resource to which the request header is applied; (c) a file name for an application that is stored on the third network resource; (d) a query argument and (e) an authentication argument.

23. The method of claim 1, wherein step (b) further comprises the step of:
(b1) executing an application on a second network resource, the application causing the coupling of the at least one authentication argument and the at least one query argument with the at least one request.

24. The method of claim 23, wherein the application that is executed on the second network resource uses a Common Gateway Interface (CGI) protocol.

25. The method of claim 23, wherein the application that is executed on the second network resource uses a gateway interface selected from the group consisting of non-Common Gateway Interface (CGI) program object oriented communications protocols and non-CGI program server extensions.

26. The method of claim 23, further comprising the steps of:
(b2) determining whether an authentication of the user is needed before the at least one request is sent to the second network resource; and
(b3) performing the authentication of the user if the authentication of the user is required.

27. The method of claim 23, wherein the at least one request comprises an argument that acts as a key in a table lookup and wherein the application executes on the second network resource and correlates to the table lookup the key with one of a plurality of expert predetermined optimum values, each expert predetermined value comprising a network address for a database, a query argument, and an authentication argument.

28. The method of claim 27, wherein the key can be used to create a window for viewing by the user, the window presenting the user with a menu of choices for further areas of research pertaining to the key.

29. The method of claim 28, wherein the user, by selecting one of the choices, causes the application that is executed on the second network resource to match a key, corresponding to one of the choices in the table lookup, with a request header comprising: (a) a purpose of the request; (b) a network address for a third network resource to which the request header is applied; (c) a file name for an application that is stored on the third network resource; (d) a query argument; and (e) an authentication argument; and causes the application on the second network resource to send the request header to the third network resource.

30. The method of claim 27, wherein the application that is executed on the second network resource matches one of the expert predetermined optimum values with the key in the table lookup selected from the group consisting of a hash table, an associative array and a linked list.

31. The method of claim 23, wherein the application that is executed on the second network resource modifies the at least one record that satisfies the at least one query argument.

32. The method of claim 23, wherein the application that is executed on the second network resource causes a browser to subdivide the display into the plurality of windows.

33. The method of claim 23, wherein the application executing on the second network resource causes the at least one record that satisfies the at least one query argument to appear in the largest window of the plurality of windows.

34. The method of claim 23, wherein the application that is executed on the second network resource causes a plurality of buttons corresponding to a plurality of arguments for selecting a plurality of databases to appear in at least a second window of the plurality of windows.

35. The method of claim 34, wherein the plurality of buttons comprise arguments that act as keys in a table lookup, with each of the keys corresponding to a specific link in the at least one file of information on the first network resource.

36. The method of claim 34, wherein the application that is executed on the second network resource causes an excerpt of text that includes the at least one line in the at least one file of information to appear on at least a first, second or third window of the plurality of windows.

37. The method of claim 34, wherein the application that is executed on the second network resource causes information associated with the source of the at least one file of information to appear in at least a first, second, third or fourth window of the plurality of windows.

38. The method of claim 37, wherein the user may cause through an object within the display to increase and decrease the viewing area of any one of the plurality of windows.

39. The method of claim 23, wherein step (b1) is executed on a browser by a scripted language or an embedded application.

40. The method of claim 1, wherein the database authenticates the user when the user executed a search, and returns to a second network resource the at least one record that satisfies the at least one query argument.

41. The method of claim 1, wherein the at least one link is identified by one or more icons.

* * * * *